(12) United States Patent
Aiso

(10) Patent No.: US 11,209,312 B2
(45) Date of Patent: Dec. 28, 2021

(54) SPECTROSCOPIC CAMERA AND INSPECTION SYSTEM

(71) Applicant: Seiko Epson Corporation, Tokyo (JP)

(72) Inventor: Seiji Aiso, Shiojiri (JP)

(73) Assignee: Seiko Epson Corporation

( * ) Notice: Subject to any disclaimer, the term of this patent is extended or adjusted under 35 U.S.C. 154(b) by 14 days.

(21) Appl. No.: 16/829,165

(22) Filed: Mar. 25, 2020

(65) Prior Publication Data
US 2020/0309599 A1  Oct. 1, 2020

(30) Foreign Application Priority Data

Mar. 26, 2019 (JP) .............................. JP2019-059482

(51) Int. Cl.
*G01J 3/28* (2006.01)
*H04N 5/33* (2006.01)
*G01N 21/25* (2006.01)

(52) U.S. Cl.
CPC ............ *G01J 3/2823* (2013.01); *H04N 5/332* (2013.01); *G01J 2003/2826* (2013.01); *G01N 21/25* (2013.01)

(58) Field of Classification Search
CPC .... G01J 2003/2826; G01J 3/26; G01J 3/2823; G01N 2021/8809; G01N 2021/8835; G01N 2021/8887; G01N 2021/945; G01N 2021/9518; G01N 21/25; G01N 21/94; G01N 21/9515; G06K 9/4652; G06K 9/6215; H04N 5/23212; H04N 5/332
See application file for complete search history.

(56) References Cited

U.S. PATENT DOCUMENTS

| 2006/0258942 | A1* | 11/2006 | Van Beek | ............... | G01N 21/65 600/477 |
| 2013/0265406 | A1 | 10/2013 | Mitsui | | |
| 2014/0240508 | A1* | 8/2014 | Gomi | .................... | G01J 3/0235 348/162 |
| 2015/0316416 | A1* | 11/2015 | Funamoto | ............. | G01J 3/2823 356/456 |

FOREIGN PATENT DOCUMENTS

JP          2012-154628 A      8/2012

* cited by examiner

*Primary Examiner* — Hina F Ayub
(74) *Attorney, Agent, or Firm* — Harness, Dickey & Pierce, P.L.C.

(57) ABSTRACT

A spectroscopic camera according to the present disclosure includes a spectroscopic section configured by a variable wavelength interference filter that selectively transmits light at a predetermined wavelength and changes the light to transmitted light, a receiving section configured to receive sensitivity information indicating a sensitivity curve in a wavelength region of a predetermined color imaged by an RGB camera, a wavelength-table generating section configured to generate, based on the sensitivity information, a wavelength table indicating a relation between the predetermined wavelength and a transmission time, which is a time for transmitting the transmitted light, an imaging section configured to acquire a spectral image formed by the transmitted light transmitted through the spectroscopic section, and a control section configured to control the spectroscopic section and the imaging section based on the wavelength table.

7 Claims, 20 Drawing Sheets

★ : IMAGING POINT
⇧ : ROBOT OPERATION

| WAVELENGTH [nm] | ΔZ [mm] | Scale [TIMES] |
|---|---|---|
| 600 | 5 | 1 |
| 700 | 12 | 0.8 |
| 800 | 15 | 0.75 |
| 900 | 17 | 0.73 |
| 1000 | 18 | 0.72 |

( ΔZ INDICATES DISTANCE FROM POSITION P1)

FIG. 16

```
Function SpectrumInsp

Go P0
    Wait 0.5

VRunWithMotion ColorTest
    Go P10

Boolean pd
    VGet ColorTest.AllPassed, pd
Fend
```

| WAVELENGTH | R COMPONENT/ SPECTROSCOPIC CAMERA | G COMPONENT/ SPECTROSCOPIC CAMERA | B COMPONENT/ SPECTROSCOPIC CAMERA |
|---|---|---|---|
| 400nm | 0.00/0.70 | 0.00/0.70 | 0.25/0.70 |
| 420nm | 0.00/0.76 | 0.02/0.76 | 0.42/0.76 |
| 440nm | 0.00/0.82 | 0.08/0.82 | 0.71/0.82 |
| ⋮ | ⋮ | ⋮ | ⋮ |
| 640nm | 0.91/0.71 | 0.03/0.71 | 0.00/0.71 |
| 660nm | 0.86/0.70 | 0.03/0.70 | 0.00/0.70 |
| 680nm | 0.73/0.76 | 0.07/0.76 | 0.00/0.76 |

SPECTROSCOPIC CAMERA AND INSPECTION SYSTEM

The present application is based on, and claims priority from JP Application Serial Number 2019-059482, filed Mar. 26, 2019, the disclosure of which is hereby incorporated by reference herein in its entirety.

BACKGROUND

1. Technical Field

The present disclosure relates to a spectroscopic camera and an inspection system.

2. Related Art

There has been known an image inspection for, when an article is produced, in an inspection process for inspecting a produced article or an article being produced, acquiring an image of the article using a camera and performing an inspection using the image in order to inspect surface properties of such an article.

As the camera for acquiring the image of the article, a spectroscopic camera for capturing spectrum information, that is, a spectrum image or an RGB camera for capturing an RGB image is selected. It is requested to determine, prior to introduction of the camera, a type of the camera introduced into the inspection according to a type of an article to be inspected, accuracy required for the inspection, or the like, that is, determine whether the RGB camera is sufficient or the spectroscopic camera needs to be selected.

For example, JP A-2012-154628 (Patent Literature 1) proposes an inspection system including an RGB camera for acquiring an RGB image of an article, a spectroscopic camera for acquiring a spectrum image of the article, and optical paths of two systems for acquiring these images, the inspection system being configured to switch the optical paths of the two systems to be capable of imaging an object, which is the same article.

However, in the inspection system proposed in Patent Literature 1, a mechanism for switching the optical paths of the two systems is necessary. Configurations of devices included in the inspection system are complicated.

SUMMARY

The present disclosure can be implemented as the following application examples.

A spectroscopic camera according to an application example of the present disclosure includes: a spectroscopic section configured by a variable wavelength interference filter that selectively transmits light at a predetermined wavelength and changes the light to transmitted light; a receiving section configured to receive sensitivity information indicating a sensitivity curve in a wavelength region of a predetermined color imaged by an RGB camera; a wavelength-table generating section configured to generate, based on the sensitivity information, a wavelength table indicating a relation between the predetermined wavelength and a transmission time, which is a time for transmitting the transmitted light; an imaging section configured to acquire a spectral image formed by the transmitted light transmitted through the spectroscopic section; and a control section configured to control the spectroscopic section and the imaging section based on the wavelength table.

BRIEF DESCRIPTION OF THE DRAWINGS

FIG. 16 is a schematic diagram showing an example of conditions input when the inspection processing included in the inspection method for inspecting surface properties of an article is carried out by the robot system shown in FIG. 4.

DESCRIPTION OF EXEMPLARY EMBODIMENTS

A spectroscopic camera and an inspection system according to the present disclosure are explained in detail below based on a preferred embodiment shown in the accompanying drawings.

In the following explanation, as an example, the spectroscopic camera and the inspection system according to the present disclosure applied to a robot system are explained in detail.

Robot System

Figure 1:
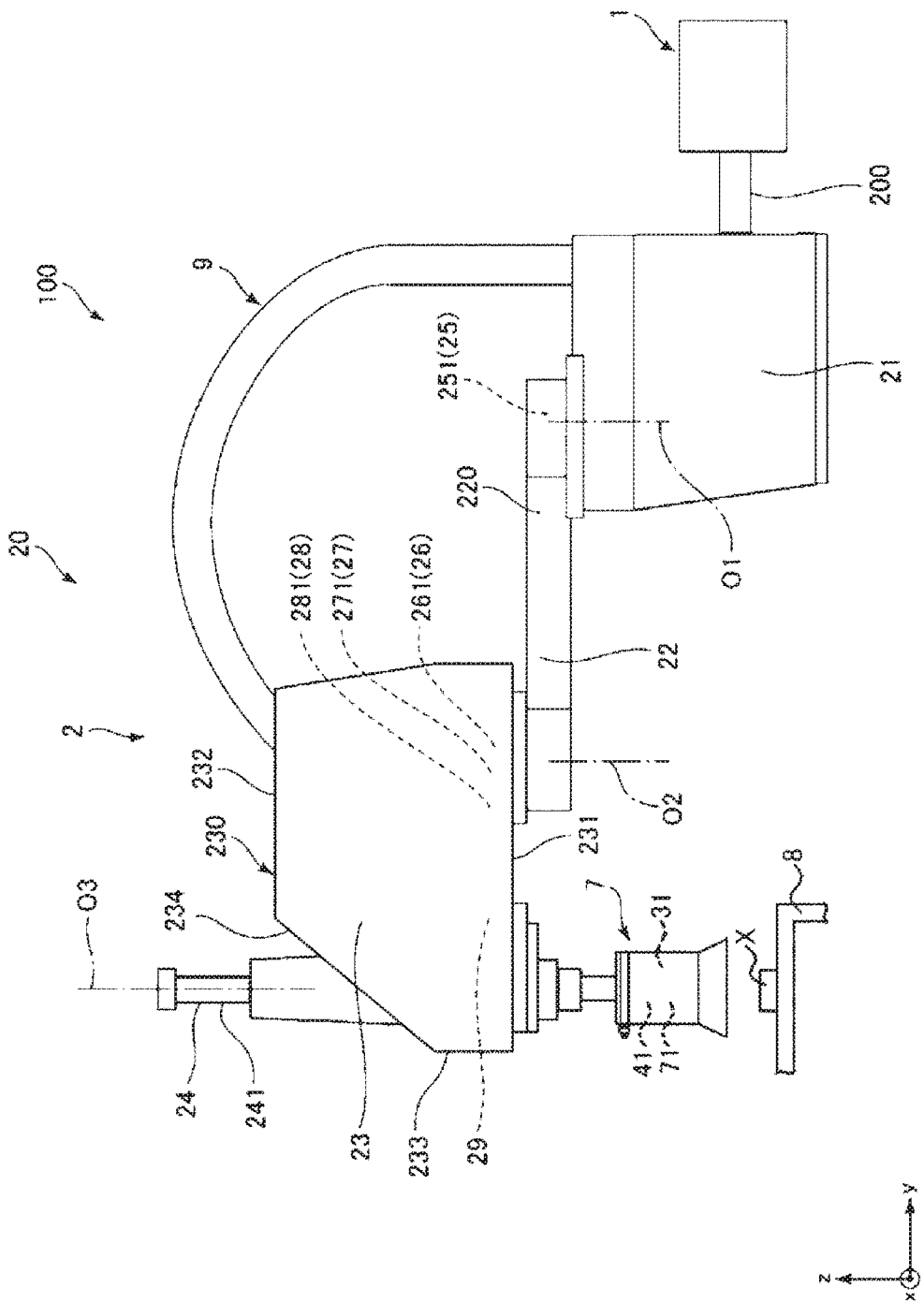
FIG. 1 is a side view showing an embodiment of a robot system applied with a spectroscopic camera and an inspection system according to the present disclosure.
Figure 2:
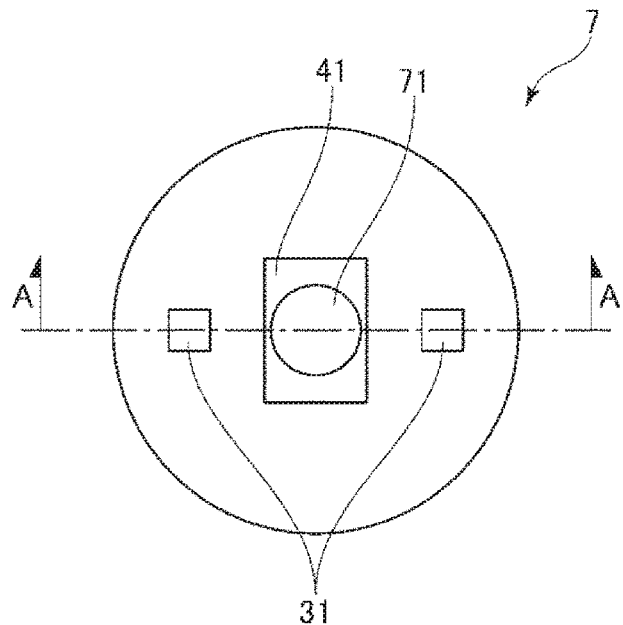
FIG. 2 is a plan view showing a lens side of the spectroscopic camera included in the robot system shown in FIG. 1.
Figure 3:
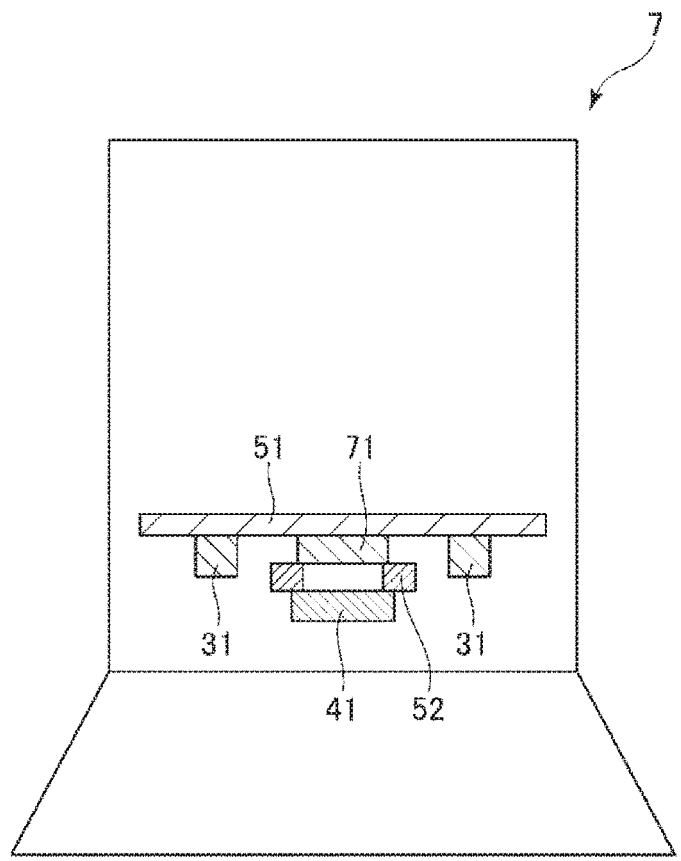
FIG. 3 is an A-A line sectional view of the spectroscopic camera shown in FIG. 2.
Figure 4:
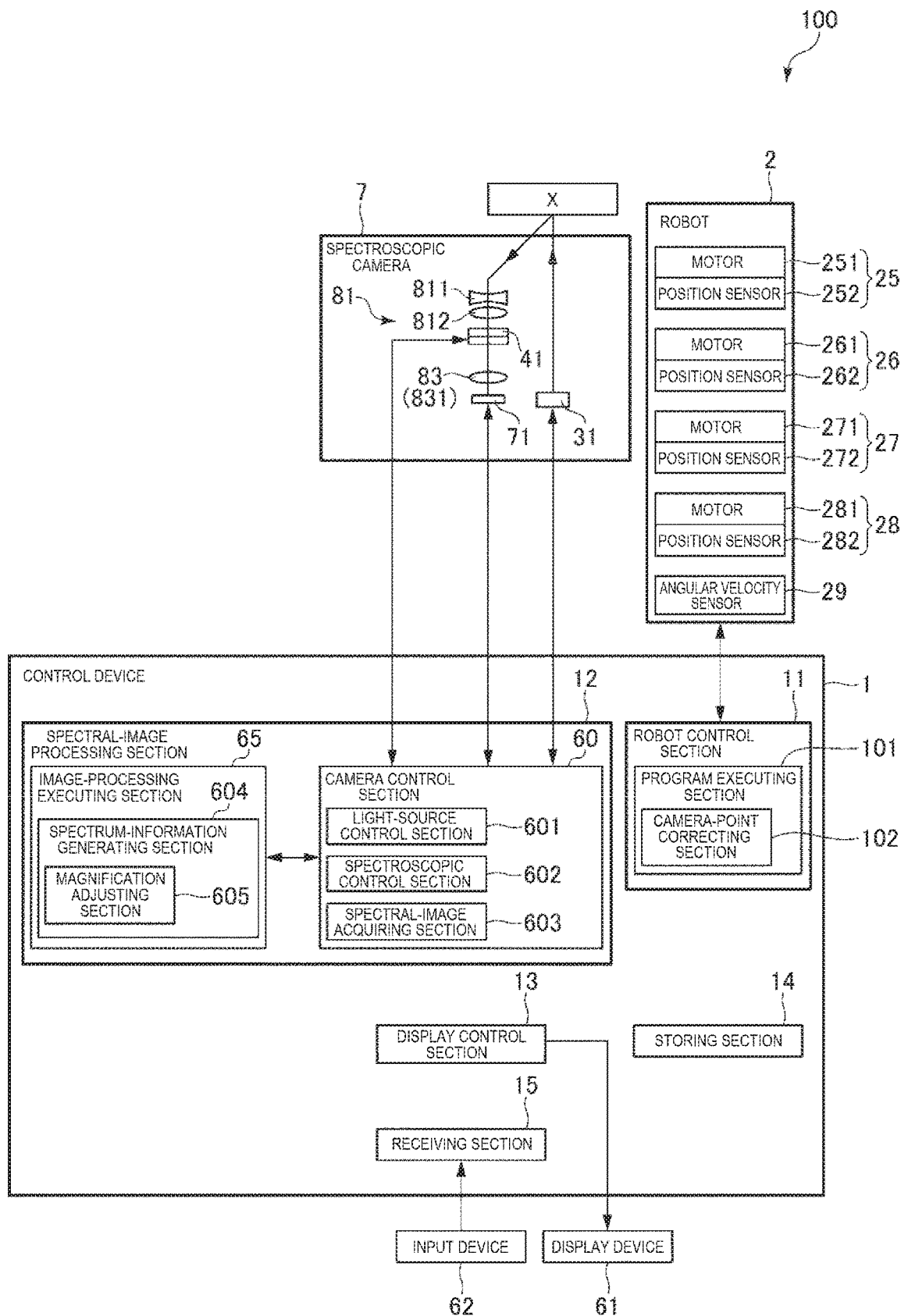
FIG. 4 is a block diagram showing a schematic configuration of the robot system shown in FIG. 1.
Figure 5:
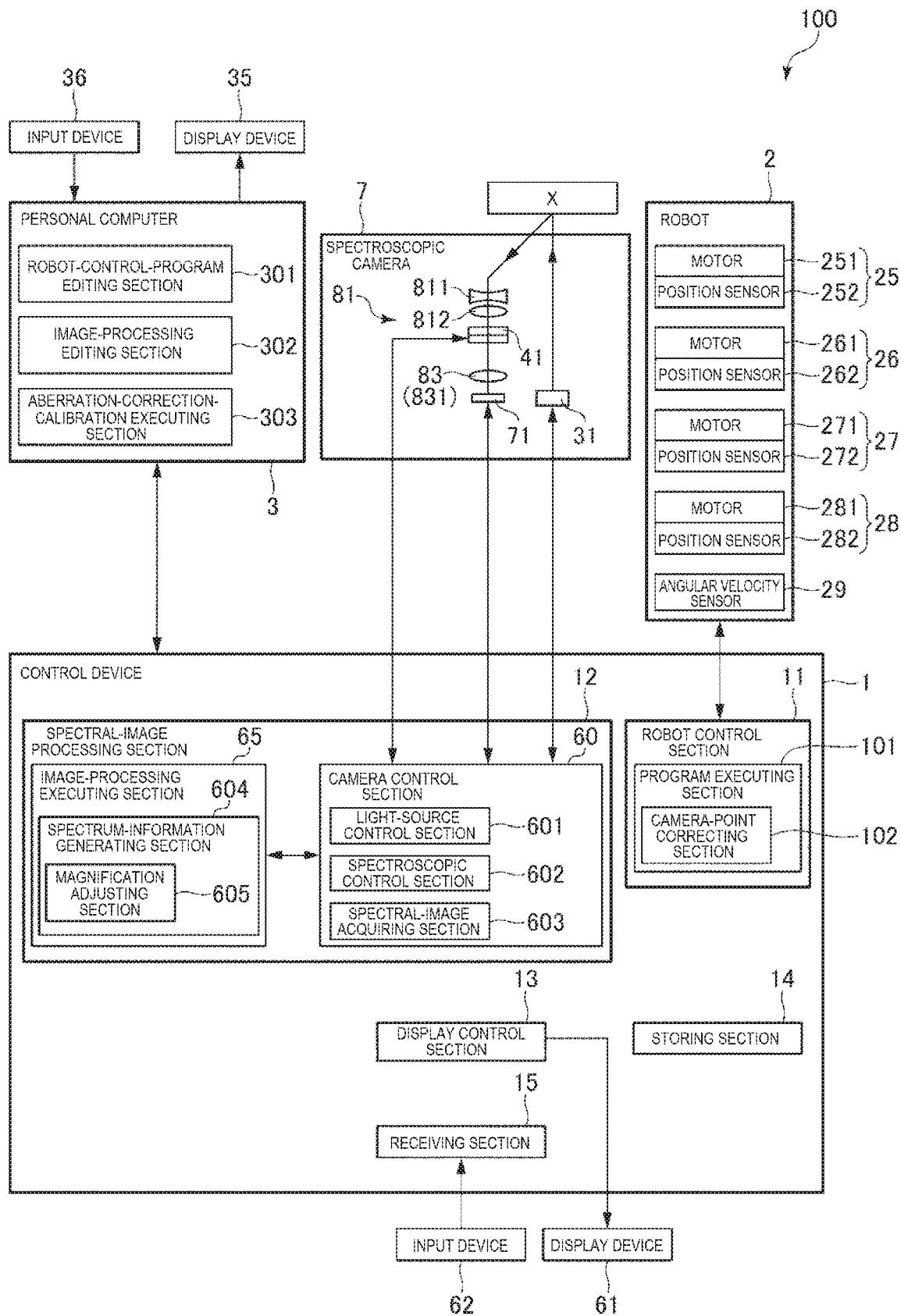
FIG. 5 is a block diagram showing a schematic configuration of the robot system shown in FIG. 1 attached with a personal computer.
Figure 6:
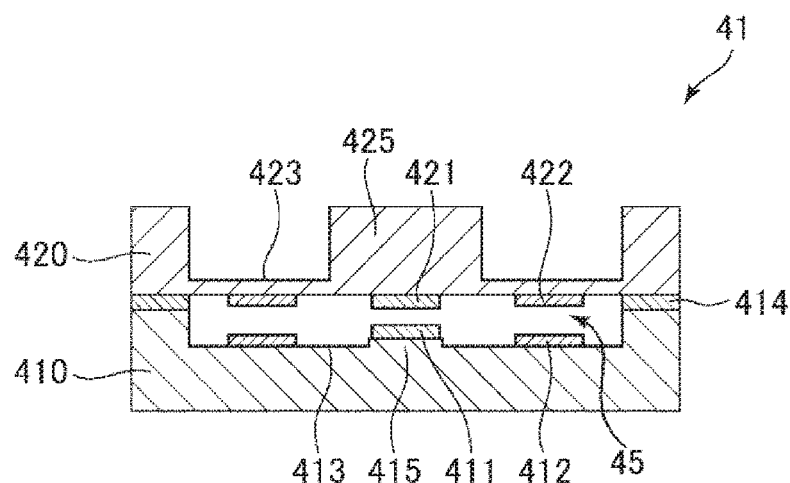
FIG. 6 is a longitudinal sectional view showing an example in which a variable wavelength interference filter included in a spectroscopic section included in the spectroscopic camera shown in FIGS. 2 and 3 is applied to a Fabry-Perot etalon filter.

FIG. 1 is a side view showing an embodiment of a robot system applied with a spectroscopic camera and an inspection system according to the present disclosure. FIG. 2 is a plan view showing a lens side of the spectroscopic camera included in the robot system shown in FIG. 1. FIG. 3 is an A-A line sectional view of the spectroscopic camera shown in FIG. 2. FIG. 4 is a block diagram showing a schematic configuration of the robot system shown in FIG. 1. FIG. 5 is a block diagram showing a schematic configuration of the robot system shown in FIG. 1 attached with a personal computer. FIG. 6 is a longitudinal sectional view showing an example in which a variable wavelength interference filter included in a spectroscopic section included in the spectroscopic camera shown in FIGS. 2 and 3 is applied to a Fabry-Perot etalon filter. In FIG. 1, illustration of a display device 61 and an input device 62 is omitted.

In FIG. 1, for convenience of explanation, an x axis, a y axis, and a z axis are shown as three axes orthogonal to one another. In the following explanation, a direction parallel to the x axis is referred to as "x-axis direction" as well, a direction parallel to the y axis is referred to as "y-axis direction" as well, and a direction parallel to the z axis is referred to as "z-axis direction" as well. Further, in the following explanation, a distal end side of arrows shown in the figures is referred to as "+(plus)" and a proximal end side of the arrows is referred to as "- (minus)". A direction parallel to a +x-axis direction is referred to as "+x-axis direction" as well. A direction parallel to a –x-axis direction is referred to as "–x-axis direction as well". A direction parallel to a +y-axis direction is referred to as "+y-axis direction" as well. A direction parallel to a --y-axis direction is referred to as "–y-axis direction" as well. A direction parallel to a +z-axis direction is referred to as "+z-axis direction" as well. A direction parallel to a –z-axis direction is referred to as "–z-axis direction" as well.

Further, in the following explanation, for convenience of explanation, the +z-axis direction (the z-axis direction+side) (the upper side) is referred to as "upper" as well and the –z-axis direction (the z-axis direction–side) (the lower side) is referred to as "lower" as well. About a robot arm 20, a base 21 side in FIG. 1 is referred to as "proximal end" and the opposite side of the base 21 side (a spectroscopic camera 7 side) is referred to as "distal end". The z-axis direction (the up-down direction) in FIG. 1 is represented as "vertical direction". The x-axis direction and the y-axis direction (the left-right direction) is represented as "horizontal direction".

In this specification, "horizontal" includes not only complete horizontality but also inclination at ±5° or less with respect to horizontality. Similarly, in this specification, "vertical" includes not only complete verticality but also inclination at ±5° or less with respect to verticality. In this specification, "parallel" includes not only complete parallelism of two lines (including axes) or surfaces but also inclination of the two lines or the surfaces at ±5° or less. In this specification, "coincide" includes not only complete coincidence of two lines (including axes) or surfaces but also inclination of the two lines or the surfaces at ±5° or less. In this specification, "orthogonal" includes not only complete orthogonality of two lines (including axes) or surfaces but also inclination of the two lines or the surfaces at ±5° or less.

A robot system 100 shown in FIGS. 1, 4, and 5 are used to, for example, in order to inspect surface properties of an article produced or being produced in a production line, that is, a color of the article and presence or absence of foreign matters adhering to the article, with this article set as an object X, acquire spectral information of the object X. The robot system 100 includes a control device 1, a robot 2, a spectroscopic camera 7, a display device 61 (a display section), and an input device 62 (an input section) and further includes a detachable personal computer 3.

In the configuration shown in the figures, the control device 1 is disposed on the outer side of the robot 2. However, not only this, but the control device 1 may be incorporated in the robot 2 or the spectroscopic camera 7.

In the configuration shown in the figures, the robot 2, the spectroscopic camera 7, the personal computer 3, and the control device 1 are electrically coupled (hereinafter simply referred to as "coupled" as well) to one another via a cable 200 or the like. However, not only this, but the robot 2, the spectroscopic camera 7, the personal computer 3, and the control device 1 may perform communication in a wireless scheme. That is, the robot 2 and the control device 1 may be connected by wired communication or may be connected by wireless communication.

Sections configuring the robot system 100 are explained below.

Robot

A type of the robot 2 is not particularly limited if the robot 2 is capable of moving the spectroscopic camera 7 in the vertical direction. However, in this embodiment, the robot 2 is configured by a SCARA robot, which is an example of a horizontal articulated robot.

The robot 2 includes, as shown in FIG. 1, a base 21, a first arm 22, a second arm 23, a work head 24, and a pipe member 9. The robot arm 20 is configured by the first arm 22, the second arm 23, the work head 24, and the like.

The robot 2 includes a driving section 25 configured to turn (drive) the first arm 22 with respect to the base 21, a driving section 26 configured to turn the second arm 23 with respect to the first arm 22, a driving section 27 configured to turn a shaft 241 of the work head 24 with respect to a second arm 23, a driving section 28 configured to move the shaft 241 in the z-axis direction with respect to the second arm 23, and an angular velocity sensor 29.

The driving section 25 includes, as shown in FIGS. 4 and 5, a motor 251 incorporated in a housing 220 of the first arm 22 and configured to generate a driving force, a not-shown speed reducer configured to reduce the driving force of the motor 251, and a position sensor 252 configured to detect a rotation angle of a rotating shaft of the motor 251 or the speed reducer.

The driving section 26 includes a motor 261 incorporated in a housing 230 of the second arm 23 and configured to generate a driving force, a not-shown speed reducer configured to reduce the driving force of the motor 261, and a position sensor 262 configured to detect a rotation angle of a rotating shaft of the motor 261 or the speed reducer.

The driving section 27 includes a motor 271 incorporated in the housing 230 of the second arm 23 and configured to generate a driving force, a not-shown speed reducer configured to reduce the driving force of the motor 271, and a position sensor 272 configured to detect a rotation angle of a rotating shaft of the motor 271 or the speed reducer.

The driving section 28 includes a motor 281 incorporated in the housing 230 of the second arm 23 and configured to generate a driving force, a not-shown speed reducer configured to reduce the driving force of the motor 281, and a position sensor 282 configured to detect a rotation angle of a rotating shaft of the motor 281 or the speed reducer.

As the motor 251, the motor 261, the motor 271, and the motor 281, for example, a servomotor such as an AC servomotor or a DC servomotor can be used. As the speed reducers, for example, a speed reducer of a planetary gear type or a wave motion gear device can be used. The position sensor 252, the position sensor 262, the position sensor 272, and the position sensor 282 can be, for example, an angle sensor.

The driving section 25, the driving section 26, the driving section 27, and the driving section 28 are respectively coupled to not-shown motor drivers corresponding thereto and are controlled by a robot control section 11 of the control device 1 via the motor drivers. The speed reducers may be omitted.

The angular velocity sensor 29 (a sensor) is incorporated in the second arm 23. Accordingly, the angular velocity sensor 29 can detect angular velocity of the second arm 23. The control device 1 controls the robot 2 based on information concerning the detected angular velocity. The angular velocity sensor 29 is set further on the −y-axis side, that is, a far side of the base 21 than the driving sections 26 to 28.

The base 21 is fixed to, for example, a not-shown floor surface by bolts or the like. The first arm 22 is coupled to the upper end portion of the base 21. The first arm 22 is capable of turning, with respect to the base 21, around a first turning axis O1 extending along the vertical direction. When the driving section 25 that turns the first arm 22 is driven, the first arm 22 turns within a horizontal plane around the first turning axis O1 with respect to the base 21. Driving (a turning amount) of the first arm 22 with respect to the base 21 can be detected by the position sensor 252.

The second arm 23 is coupled to the distal end portion of the first arm 22. The second arm 23 is capable of turning, with respect to the first arm 22, around a second turning axis O2 extending along the vertical direction. The axial direction of the first turning axis O1 and the axial direction of the second turning axis O2 are the same. That is, the second turning axis O2 is parallel to the first turning axis O1. When the driving section 26 that turns the first arm 22 is driven, the second arm 23 turns within the horizontal plane around the second turning axis O2 with respect to the first arm 22. Driving (a turning amount) of the second arm 23 with respect to the first arm 22 can be detected by the position sensor 262.

The second arm 23 includes the housing 230 including a bottom plate 231, a top plate 232, and a sidewall 233 that couples the bottom plate 231 and the top plate 232. The angular velocity sensor 29, the driving section 26, the driving section 27, and the driving section 28 are arranged in this order from the +y-axis side on the inside of the housing 230, that is, on the bottom plate 231.

The housing 230 includes an inclined section 234 located between the top plate 232 and the sidewall 233. The inclined section 234 is provided on the −y-axis side of the top plate 232. The inclined section 234 is provided to be inclined with respect to the z axis.

The work head 24 including the shaft 241 is set at the distal end portion of the second arm 23. The shaft 241 is capable of turning, with respect to the second arm 23, around a third turning axis O3 extending along the vertical direction and is capable of moving (rising and falling) along the up-down direction, that is, the vertical direction. The shaft 241 is a third arm of the robot arm 20 and is an arm at the most distal end of the robot arm 20.

When the driving section 27 that turns the shaft 241 is driven, the shaft 241 normally and reversely rotates (turns) around the z axis. A rotation amount of the shaft 241 with respect to the second arm 23 can be detected by the position sensor 272.

When the driving section 28 that moves the shaft 241 in the z-axis direction is driven, the shaft 241 moves in the up-down direction (the z-axis direction). A movement amount in the z-axis direction of the shaft 241 with respect to the second arm 23 can be detected by the position sensor 282.

The spectroscopic camera 7 is detachably disposed at the distal end portion (the lower end portion) of the shaft 241. The spectroscopic camera 7 is used to, in order to inspect surface properties of an article produced or being produced in a production line, with this article set as an object X, acquire spectral information, that is, a spectrum of the object X. Details of the spectroscopic camera 7 are explained below.

In this embodiment, the spectroscopic camera 7 is not a component of the robot 2. However, a part or the entire spectroscopic camera 7 may be a component of the robot 2. In this embodiment, the spectroscopic camera 7 is not a component of the robot arm 20. However, a part or the entire spectroscopic camera 7 may be a component of the robot arm 20.

Spectroscopic Camera

As shown in FIG. 1, the spectroscopic camera 7 is detachably coupled to the distal end portion (the lower end portion) of the shaft 241 directly or via a not-shown coupling member such that the up-down direction coincides with an optical axis direction of the spectroscopic camera 7.

The spectroscopic camera 7 acquires, based on the control by the control device 1, peculiar spectral information of the object X, which is the produced article or the article being produced. More specifically, the spectroscopic camera 7 receives reflected light reflected on the object X and splits the reflected light to selectively transmit light having a specific wavelength or in a specific wavelength region (in the following explanation, "specific wavelength" is representatively explained) and thereafter acquires spectrum information based on a spectral image of the object X obtained by imaging the light having the specific wavelength.

In this embodiment, the object X is set on an extended line in the optical axis direction of the spectroscopic camera 7, that is, the up-down direction and on a workbench 8 included in the robot 2.

In this way, the spectroscopic camera 7 acquires peculiar spectrum information of the object X in a predetermined wavelength region and inspects, based on the spectrum information, surface properties of the object X, that is, the produced article or the article being produced. Therefore, it is possible to inspect, with excellent accuracy, surface properties of such an article, that is, a color of the article and presence or absence of foreign matters adhering to the article.

A wavelength region acquired by the spectroscopic camera 7 in order to inspect surface properties of the object X, that is, the produced article or the article being produced may be selected from a visible light region, may be selected from an infrared ray region, an ultraviolet ray region, or the like, or may be selected from at least two regions among the visible light region, the infrared ray region, the ultraviolet ray region, and the like.

As shown in FIGS. 1 to 5, in this embodiment, the spectroscopic camera 7 includes a light source 31 configured to irradiate light on the object X, an imaging element 71 configured to capture an image based on reflected light reflected on the object X, and a spectroscopic section 41 configured to selectively emit light having a predetermined wavelength from incident light and capable of changing a wavelength or a wavelength region of emission light to be emitted.

In such a spectroscopic camera 7, as shown in FIGS. 2 and 3, the spectroscopic section 41 is disposed between the imaging element 71 and the object X in a state in which the light source 31 and the imaging element 71 are disposed to face the same direction on a lens side of the spectroscopic camera 7. By disposing the light source 31, the spectroscopic section 41, and the imaging element 71 in such a positional relation, the spectroscopic camera 7 is configured as a spectroscopic camera in a post-dispersive spectroscopy by the light source 31, the spectroscopic section 41, and the imaging element 71. The spectroscopic camera 7 may be configured as a spectroscopic camera in a pre-dispersive spectroscopy.

The configurations of the sections included in the spectroscopic camera 7 are explained below.

The light source 31 is an optical element that irradiates illumination light toward the object X.

As shown in FIGS. 2 and 3, the light source 31 is disposed on the lens side of the spectroscopic camera 7 on a circuit board 51, which is disposed in a housing of the spectroscopic camera 7, to be able to irradiate illumination light toward the object X.

The spectroscopic section 41 is not disposed between the light source 31 and the object X. Consequently, light emitted from the light source 31 is directly irradiated on the object X.

Examples of such a light source 31 include an LED light source, an OLED light source, a Xenon lamp, and a halogen lamp. A light source having light intensity in an entire wavelength region where spectrometry is performed by the spectroscopic section 41 configured by the variable wavelength interference filter, that is, a light source capable of irradiating white light having light intensity over an entire visible light region is desirably used. Besides the white light source, the light source 31 may include a light source capable of irradiating light having a predetermined wavelength such as infrared light.

The light source 31 may be omitted in the spectroscopic camera 7. In this case, light irradiated on the object X by natural light such as the sun or an external light source such as a fluorescent lamp is reflected, whereby reflected light reflected on the object X is generated.

The imaging element 71, that is, an imaging section functions as a detecting section that captures an image based on the reflected light reflected on the object X to detect the reflected light reflected on the object X.

As shown in FIGS. 2 and 3, the imaging element 71 is disposed on the lens side of the spectroscopic camera 7 on the circuit board 51, which is disposed in the housing of the spectroscopic camera 7, to be able to receive the reflected light reflected on the object X.

The spectroscopic section 41 is disposed between the imaging element 71 and the object X. Consequently, emission light having a specific wavelength, that is, a predetermined wavelength in incident light made incident on the spectroscopic section 41 from the object X is selectively emitted. The emission light is imaged as a spectral image, that is, spectral information by the imaging element 71.

Such an imaging element 71 is configured by, for example, a CCD or a CMOS.

The spectroscopic section 41 is capable of selectively emitting light having a spectral wavelength, which is a specific wavelength, from the incident light and changing a wavelength region of the emission light. In other words, the spectroscopic section 41 selectively emits, that is, transmits the light having the specific wavelength, that is, the predetermined wavelength toward the imaging element 71 as emission light, that is, transmitted light from the incident light.

As shown in FIG. 3, the spectroscopic section 41 is dispose on a circuit board 52 disposed in the housing of the spectroscopic camera 7.

The spectroscopic section 41 is disposed between the imaging element 71 and the object X, that is, an optical axis between the imaging element 71 and the object X. Consequently, the spectroscopic section 41 selectively emits, toward the imaging element 71, the emission light having the specific wavelength in the incident light made incident on the spectroscopic section 41 from the object X1.

In the present disclosure, such a spectroscopic section 41 is configured by a variable wavelength interference filter to be capable of changing a wavelength region of the emission light to be emitted. The variable wavelength interference filter is not particularly limited. Examples of the variable wavelength interference filter include a Fabry-Perot etalon filter of a variable wavelength type that adjusts the size of a gap between two filters (mirrors) with an electrostatic actuator to control a wavelength of reflected light to be transmitted, an acoustooptic tunable filter (AOTF), a linear variable filter (LVF), and a liquid crystal tunable filter (LCTF). Above all, the variable wavelength interference filter is desirably the Fabry-Perot etalon filter.

The Fabry-Perot etalon filter extracts reflected light having a desired wavelength using multiple interference by two filters. Accordingly, it is possible to reduce a thickness dimension as much as possible and, specifically, set the thickness dimension to 2.0 mm or less. Accordingly, the spectroscopic section 41 and the spectroscopic camera 7 can be further reduced in size. Therefore, it is possible to realize further reduction in the size of the spectroscopic camera 7 by using the Fabry-Perot etalon filter as the variable wavelength filter.

The spectroscopic section 41 applied with the Fabry-Perot etalon filter of the variable wavelength type as the variable wavelength interference filter is explained with reference to FIG. 6.

The Fabry-Perot etalon filter is an optical member having a rectangular plate shape in a plan view and includes a fixed substrate 410, a movable substrate 420, a fixed reflective film 411, a movable reflective film 421, a fixed electrode 412, a movable electrode 422, and a bonding film 414. In a state in which the fixed substrate 410 and the movable substrate 420 are laminated, the fixed substrate 410 and the movable substrate 420 are integrally bonded via the bonding film 414.

In the fixed substrate 410, a groove 413 is formed by etching in the thickness direction to surround the center of the fixed substrate 410 such that a reflective-film setting section 415 is formed in the center. In the fixed substrate 410 having such a configuration, a fixed optical mirror configured by the fixed reflective film 411 is provided on the movable substrate 420 side of the reflective-film setting section 415 and the fixed electrode 412 is provided on the movable substrate 420 side of the groove 413.

In the movable substrate 420, a holding section, which is a groove 423, is formed by etching in the thickness direction to surround the center of the movable substrate 420 such that a reflective-film setting section 425 is formed in the center. In the movable substrate 420 having such a configuration, a movable optical mirror configured by the movable reflective film 421 is provided on the fixed substrate 410 side of the reflective-film setting section 425 and the movable electrode 422 is provided on the fixed substrate 410 side.

In the movable substrate 420, a thickness dimension of the groove 423 is formed small compared with the reflective-film setting section 425. Consequently, the groove 423 functions as a diaphragm bent by electrostatic attraction when a voltage is applied between the fixed electrode 412 and the movable electrode 422.

The fixed substrate 410 and the movable substrate 420 can be manufactured at thickness of approximately 0.1 mm or more and 1.0 mm or less. Accordingly, the thickness of the entire Fabry-Perot etalon filter can be set to 2.0 mm or less. Therefore, a reduction in the size of the spectroscopic camera 7 can be realized.

Between the fixed substrate 410 and the movable substrate 420, the fixed reflective film 411 and the movable reflective film 421 are disposed to be opposed to each other via a gap substantially in the center of the fixed substrate 410 and the movable substrate 420. The fixed electrode 412 and the movable electrode 422 are disposed to be opposed to each other via a gap in a groove section surrounding the center. An electrostatic actuator 45 that adjusts the size of the gap between the fixed reflective film 411 and the movable reflective film 421 is configured by the fixed electrode 412 and the movable electrode 422.

A bend is caused in the holding section, which is the groove 423, by electrostatic attraction caused by applying a voltage between the fixed electrode 412 and the movable electrode 422 configuring the electrostatic actuator 45. As a result, it is possible to change the size of the gap, that is, the distance between the fixed reflective film 411 and the movable reflective film 421. By setting the size of the gap as appropriate, it is possible to select a wavelength of light to be transmitted and selectively emit light having a desired wavelength (in a desired wavelength region) from incident light. By changing the configurations of the fixed reflective film 411 and the movable reflective film 421, it is possible to control a half value width of the light to be transmitted, that is, the resolution of the Fabry-Perot etalon filter.

The fixed substrate 410 and the movable substrate 420 are respectively configured by, for example, any one of various kinds of glass such as soda glass, crystalline glass, quartz glass, lead glass, potassium glass, borosilicate glass, and non-alkali glass or crystal. The bonding film 414 is configured by, for example, a plasma polymer film containing siloxane as a main material. The fixed reflective film 411 and the movable reflective film 421 are configured by, for example, a metal film of Ag or the like or an alloy film of an Ag alloy or the like or are configured by a dielectric multilayer film including $TiO_2$ as a high reflective layer and including $SiO_2$ as a low reflective layer. Further, the fixed electrode 412 and the movable electrode 422 are configured by any one of various conductive materials.

In this embodiment, the spectroscopic camera 7 includes, as shown in FIGS. 4 and 5, a spectroscopic-section-side optical system 81 and an imaging-element-side optical system 83 configured by any one of various optical components.

The spectroscopic-section-side optical system 81 is disposed between the object X and the spectroscopic section 41, includes an incident lens 811 functioning as an incident optical system and a projection lens 812, and leads reflected light reflected on the object X to the spectroscopic section 41.

The imaging-element-side optical system 83 is disposed between the spectroscopic section 41 and the imaging element 71, includes an incident and exit lens 831, and leads emission light emitted by the spectroscopic section 41 to the imaging element 71.

Since the spectroscopic camera 7 includes at least one of such optical systems 81 and 83, it is possible to achieve improvement of a condensing rate by the imaging element 71 of the reflected light reflected on the object X.

At least one of the optical systems 81 and 83 may be omitted considering the condensing rate by the imaging element 71.

Besides being disposed as explained above (see FIGS. 4 and 5), the spectroscopic-section-side optical system 81 may be disposed between the spectroscopic section 41 and the imaging-element-side optical system 83.

The spectroscopic camera 7 having the configuration explained above includes a not-shown angle sensor that detects a rotation angle of the rotating shaft of the motor 271. The rotation angle of the rotating shaft of the motor 271 can be detected by the position sensor.

In this embodiment, the spectroscopic camera 7 is attachable to and detachable from the robot arm 20. However, not only this, but the spectroscopic camera 7 may be, for example, undetachable from the robot arm 20.

Control Device

The control device 1 includes, as shown in FIGS. and 5, a robot control section 11, a spectral-image processing section 12, a display control section 13, a storing section 14, and a receiving section 15. The control device 1 respectively controls driving of the sections of the robot system 100 such as the robot 2, the spectroscopic camera 7, and the display device 61.

The control device 1 is configured to be communicable respectively with the robot control section 11, the spectral-image processing section 12, the display control section 13, the storing section 14, the receiving section 15, and the personal computer 3. That is, the robot control section 11, the spectral-image processing section 12, the display control section 13, the storing section 14, and the receiving section 15 are connected to one another by wired or wireless communication.

The robot 2, the display device 61, the input device 62, the spectroscopic camera 7, and the personal computer 3 are respectively connected to the control device 1 by wired or wireless communication. As shown in FIGS. 4 and 5, the personal computer 3 is configured to be attachable to and detachable from the control device 1, that is, the robot system 100.

Robot Control Section

The robot control section 11 controls driving of the robot 2, that is, driving of the sections of the robot arm 20 and the like included in the robot 2. The robot control section 11 is a computer installed with a program such as an OS. The robot control section 11 includes, for example, a CPU functioning as a processor, a RAM, and a ROM in which programs are stored. Functions of the robot control section 11 can be realized by, for example, the CPU executing various programs.

Specifically, the robot control section 11 controls driving of the sections included in the robot 2 by reading an operation instruction of a user input to the input device 62 and software such as programs stored in the storing section 14.

In this embodiment, the robot control section 11 includes, as shown in FIGS. 4 and 5, a program executing section 101 including a camera-point correcting section 102. The program executing section 101 executes the programs read from the storing section 14 to control the driving of the sections included in the robot 2. For example, the program executing section 101 can move the shaft 241 in the z-axis direction with respect to the second arm 23 according to the operation of the camera-point correcting section 102 included in the program executing section 101. Consequently, position correction with respect to the z-axis direction of the spectroscopic camera 7 is realized.

Spectral-Image Processing Section

The spectral-image processing section 12 configures a control section that controls operation of the sections such as the light source 31, the imaging element 71, and the spectroscopic section 41, that is, driving of the entire spectroscopic camera 7 or the sections of the spectroscopic camera 7. The spectral-image processing section 12 applies processing to a spectral image obtained by the spectroscopic camera 7 to carry out an inspection of surface properties of the object X. The spectral-image processing section 12 is a computer installed with a program such as an OS. The spectral-image processing section 12 includes, for example, a CPU functioning as a processor, a RAM, and a ROM in which programs are stored. Functions of the spectral-image processing section 12 can be realized by, for example, the CPU executing various programs.

Specifically, the spectral-image processing section 12 reads, based on an operation instruction of the user input to the input device 62, that is, conditions for acquiring peculiar spectral information of the object X, software such as the programs stored in the storing section 14 to control the operation of the light source 31, the spectroscopic section 41, and the imaging element 71. The spectral-image processing section 12 carries out, based on a spectral image, that is, spectral information of the object X obtained by the control, an inspection of surface properties of the object X, which is an article produced or being produced in a production line, and displays, on the display device 61, information such as a result in the inspection.

In this embodiment, the spectral-image processing section 12 includes, as shown in FIGS. 4 and 5, a camera control section 60 and an image-processing executing section 65. The camera control section 60 includes a light-source control section 601, a spectroscopic control section 602, and a spectral-image acquiring section 603 and controls driving of the entire spectroscopic camera 7 or the sections of the spectroscopic camera 7. The image-processing executing section 65 includes a spectrum-information generating section 604 including a magnification adjusting section 605 and applies processing to a spectral image obtained by the spectroscopic camera 7 to carry out an inspection of surface properties of the object X.

The light-source control section 601 included in the camera control section 60 controls lighting and extinction of the light source 31 based on an operation instruction of the user input to the input device 62, specifically, conditions for acquiring spectral information of the object X.

The spectroscopic control section 602 acquires, based on V-λ data stored in the storing section 14, a voltage value (an input value) of a driving voltage corresponding to a spectral wavelength, that is, a specific wavelength of light to be emitted. The spectroscopic control section 602 outputs a command signal in order to apply the acquired voltage value to the electrostatic actuator 45 of the Fabry-Perot etalon filter functioning as the spectroscopic section 41. That is, the spectroscopic control section 602 controls the operation of the spectroscopic section 41 and specifies the magnitude of the specific wavelength of the light emitted from the spectroscopic section 41. The spectroscopic control section 602 performs, based on the various data stored in the storing section 14, detection of changing timing for a wavelength, a change of the wavelength, a change of the driving voltage corresponding to the change of the wavelength, determination of a measurement end, and the like and outputs a command signal based on the determination.

The spectral-image acquiring section 603 acquires (images), in the imaging element 71, as a spectral image, that is, spectral information, light amount measurement data (a light reception amount) based on reflected light reflected on the object X and, thereafter, causes the storing section 14 to store the acquired spectral image. When causing the storing section 14 to store the spectral image, the spectral-image acquiring section 603 causes the storing section 14 to store, together with the spectral image, a wavelength or the like at which the spectral image is acquired.

The spectrum-information generating section 604 included in the image-processing executing section 65 acquires the spectral image of the object X and the measured wavelength or the like stored in the storing section 14 and, after considering the magnification of the spectral image in the magnification adjusting section 605 included in the spectrum-information generating section 604, overlays, that is, superimposes spectral images at wavelengths to acquire spectrum information as a spectrum image and performs analysis processing for the spectrum image. In other words, the spectrum-information generating section 604 carries out analysis processing for comparing the acquired spectrum image and a database of the object X stored in the storing section 14 to inspect surface properties of the object X, that is, the produced article or the article being produced and determines whether the produced article or the article being produced is a non-defective product.

The acquisition of the spectral image and the measured wavelength by the spectrum-information generating section 604 can also be directly carried out from the spectral-image acquiring section 603 not via the storing section 14.

Display Control Section

The display control section 13 has a function of causing the display device 61 to display various screens such as a window, characters, and the like. That is, the display control section 13 controls driving of the display device 61. The function of the display control section 13 can be realized by, for example, a graphic chip (GPU).

Storing Section

The storing section 14 has a function of storing various kinds of information (including data and programs). The storing section 14 stores a control program and the like. The function of the storing section 14 can be realized by a ROM and the like and a so-called external storage device (not shown in FIGS. 4 and 5).

Examples of the data include, besides applications, programs, and the like for realizing the functions of the control device 1, correlation data V-λ data indicating a wavelength of transmitted light with respect to a driving voltage applied to the electrostatic actuator 45 included in the Fabry-Perot etalon filter of the spectroscopic section 41 and a database for specifying a type and the like of the object X based on peculiar spectral information of the object X. The database indicates spectral information concerning the object X, which is an article produced or being produced in a production line, surface properties of which are inspected. The database includes spectral information concerning the object X that can determine that the produced article or the article being produced is a non-defective product.

Receiving Section

The receiving section 15 has a function of receiving an input from the input device 62. The function of the receiving section 15 can be realized by, for example, an interface circuit. For example, when a touch panel is used, the receiving section 15 has a function of an input detecting section that detects, for example, a touch of a finger of the user on the touch panel.

Display Device

The display device 61 includes a monitor (not shown in FIGS. 4 and 5) configured by, for example, a liquid crystal display or an organic EL display and has a function of displaying, for example, various images (including various screens such as a window) and characters.

The display device 61 displays various visualized images including information concerning an inspection result of surface properties of the inspected object X, that is, the produced article or the article being produced.

Examples of the visualized image displayed on the display device 61, that is, the information concerning the inspected object X include a determination result about whether the object X, that is, the produced article or the article being produced is a non-defective product and, when it is determined that the article is a defective product, a reason for the determination, a position where a defect occurs, and determination accuracy (%) of determination about whether the article is a non-defective product.

Input Device

The input device 62 is configured by, for example, a mouse and a keyboard. Therefore, the user can give instructions for various kinds of processing and the like, for example, an instruction for acquiring spectral information of the object X to the control device 1 by operating the input device 62.

Specifically, the user can give instructions to the control device 1 with operation for clicking, with the mouse of the input device 62, the various screens (the window and the like) displayed on the display device 61 and operation for inputting characters, numbers, and the like with the keyboard of the input device 62.

In this embodiment, a display and input device functioning as both of the display device 61 and the input device 62 may be provided instead of the display device 61 and the input device 62. As the display and input device, a touch panel such as an electrostatic touch panel or a pressure sensitive touch panel can be used. The input device 62 may be configured to recognize sound such as voice.

Personal Computer

The personal computer 3 carries out, based on operation instructions of the user input to an input device 36, editing and the like of software such as programs stored in the spectral-image processing section 12 and the robot control section 11 included in the control device 1 and controls driving of the robot 2 and the spectroscopic camera to carry out adjustment processing explained below. States and the like of carrying out the editing and the like and the adjustment processing are displayed on a display device 35. The personal computer 3 includes, for example, a CPU functioning as a processor, a RAM, and a ROM in which programs are stored. The functions of the personal computer 3 can be realized by, for example, the CPU executing various programs.

In this embodiment, the personal computer 3 includes, as shown in FIG. 5, a robot-control-program editing section 301, an image-processing editing section 302, and an aberration-correction-calibration executing section 303.

The robot-control-program editing section 301 edits programs to be executed by the program executing section 101 included in the robot control section 11, whereby, for example, conditions for the operation of the robot 2 are changed.

The image-processing editing section 302 edits programs to be executed by the image-processing executing section 65 included in the spectral-image processing section 12, whereby conditions for the operation of the spectroscopic camera 7, conditions for processing a spectral image acquired by the spectroscopic camera 7, and the like are changed.

The aberration-correction-calibration executing section 303 controls driving of the robot 2 and the spectroscopic camera 7 to carry out adjustment processing explained below.

The personal computer 3 is configured to be attachable to and detachable from the control device 1, that is, the robot system 100. When editing software such as programs stored in the spectral-image processing section 12 and the robot control section 11 and when carrying out the adjustment processing explained below, the personal computer 3 is attached to the control device 1 as shown in FIG. 5.

Otherwise, for example, when carrying out inspection processing explained below, the personal computer 3 may be detached from the control device 1 as shown in FIG. 4.

In this embodiment, the number of turning axes of the robot arm 20 is three. However, in the present disclosure, not only this, but the number of turning axes of the robot arm 20 may be, for example, one, two, or four or more. That is, in this embodiment, the number of arms (links) is three. However, in the present disclosure, not only this, but the number of arms (links) may be, for example, two or four or more.

Further, in this embodiment, the number of robot arms 20 is one. However, in the present disclosure, not only this, but the number of robot arms 20 may be, for example, two or more. That is, the robot 2 may be a plural-arm robot such as a double-arm robot.

In the present disclosure, the robot 2 (a robot main body) may be a robot of another type (form). Specific examples of the robot 2 include a vertical articulated robot and a leg-type walking (running) robot. The "vertical articulated robot" means a robot in which the number of axes (the number of arms) is three or more and two axes among the three axes are crossing (orthogonal to) each other.

In this embodiment, the control device 1 includes the robot control section 11 and the spectral-image processing section 12 as explained above. However, the control device 1 is not limited to such a configuration. The robot control section 11 may be independently provided as a robot control device. The spectral-image processing section 12 may be independently provided as a spectral-image processing device.

The robot system 100 including the spectroscopic camera 7 and the robot 2 explained above can carry out a spectroscopic inspection method for inspecting inspection of surface properties of an article produced or being produced in a production line, that is, the object X by causing the robot control section 11 and the spectral-image processing section 12 to start the programs stored in the storing section 14. An inspection method for inspecting surface properties of an article using the robot system 100 is explained below.

Inspection Method for Inspecting Surface Properties of an Article

An inspection method for inspecting surface properties of an article, which is the object X, using the robot system 100, that is, an inspection method for inspecting a color of an article and presence or absence of foreign matters adhering to the article is explained in detail below with reference to FIGS. 7 to 19.

Figure 7:
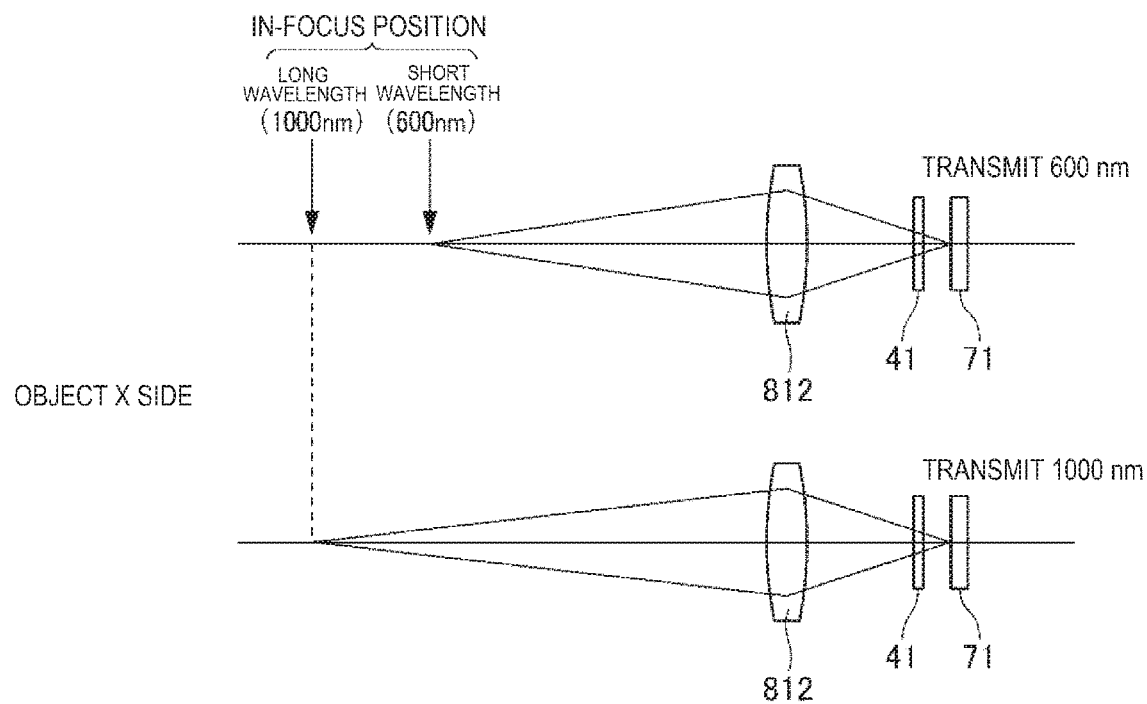
FIG. 7 is a schematic diagram showing a relation between an in-focus position and the wavelength of light transmitted through the variable wavelength interference filter.
Figure 8:
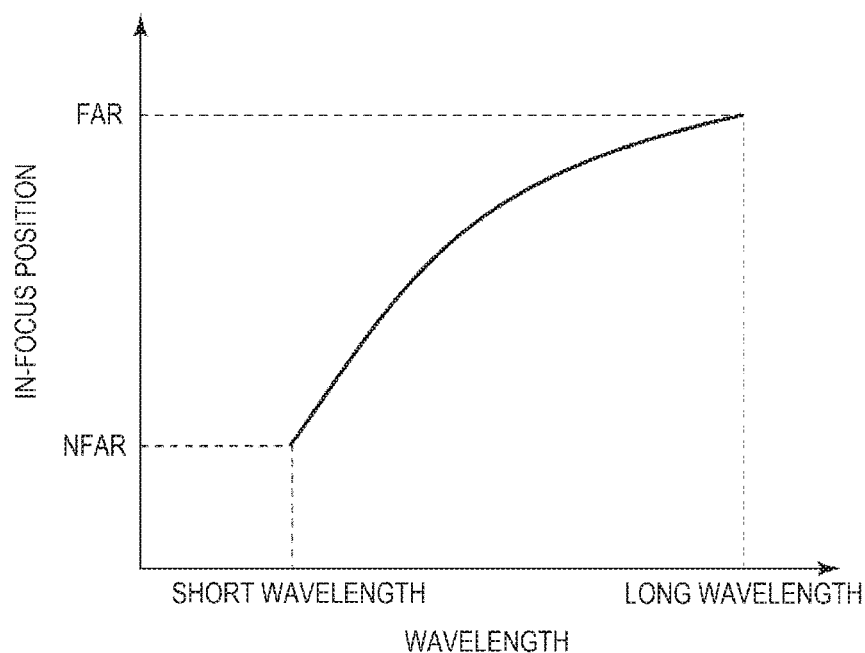
FIG. 8 is a graph showing the relation between the in-focus position and the wavelength of the light transmitted through the variable wavelength interference filter.
Figure 9:
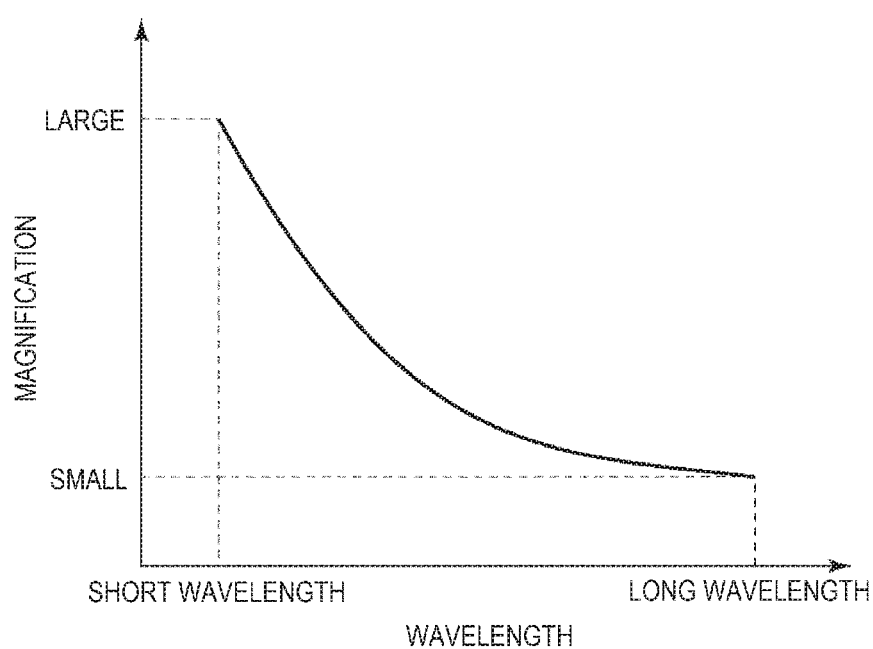
FIG. 9 is a graph showing a relation between the wavelength of the light transmitted through the variable wavelength interference filter and the magnification of a spectral image obtained at the wavelength.
Figure 10:
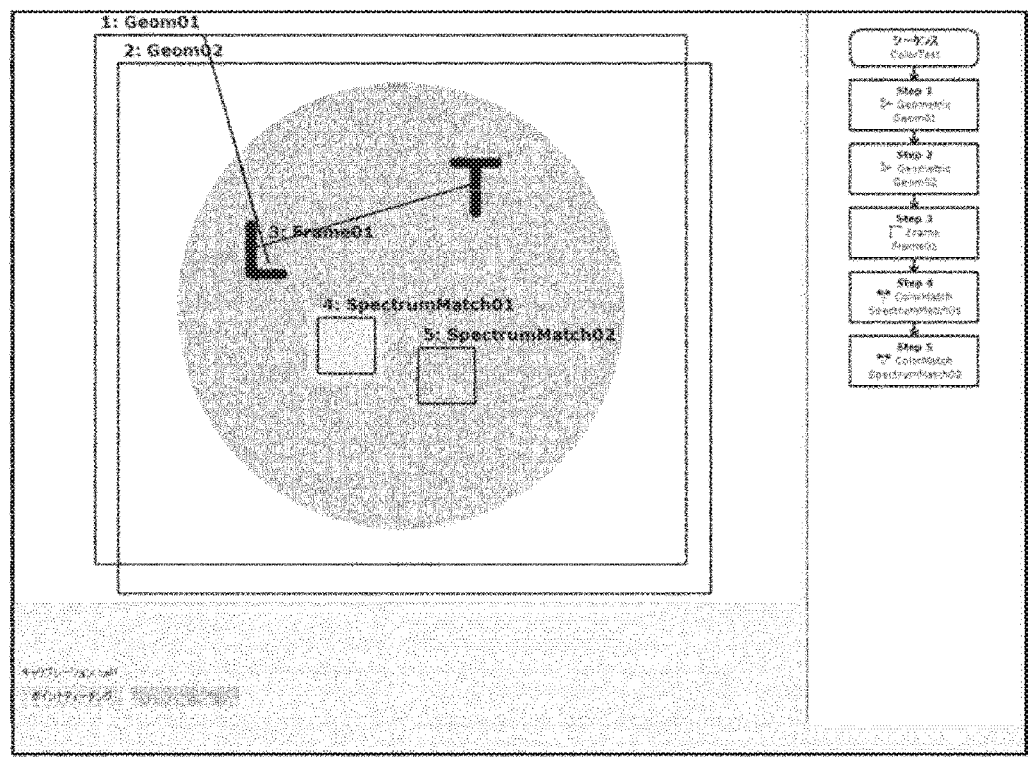
FIG. 10 is a schematic diagram for explaining overviews of adjustment processing and inspection processing carried out by an inspection method for inspecting surface properties of an article.
Figure 11:
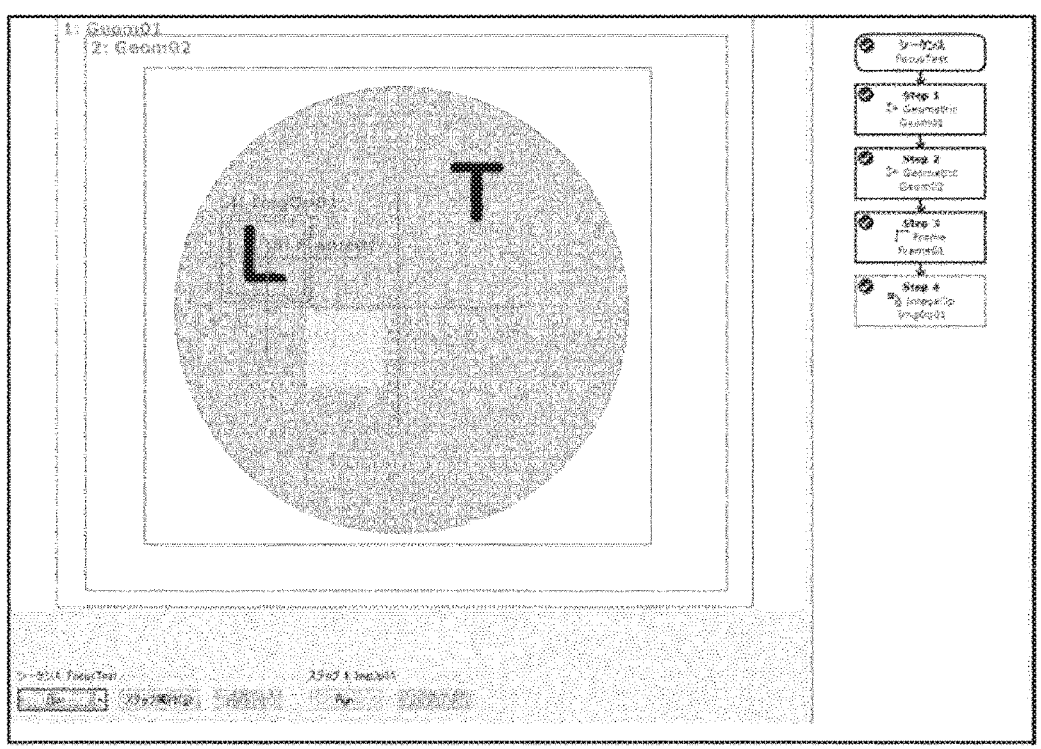
FIG. 11 is a schematic diagram for explaining the adjustment processing carried out by the inspection method for inspecting surface properties of an article.
Figure 12:
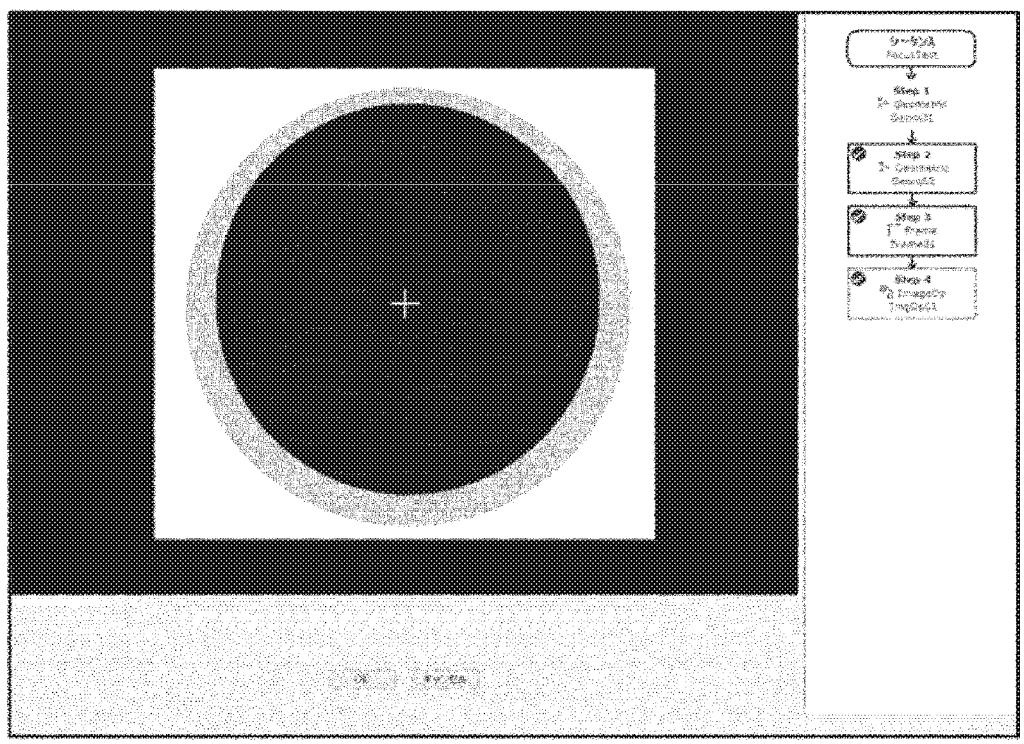
FIG. 12 is a schematic diagram for explaining the adjustment processing carried out by the inspection method for inspecting surface properties of an article.
Figure 13:
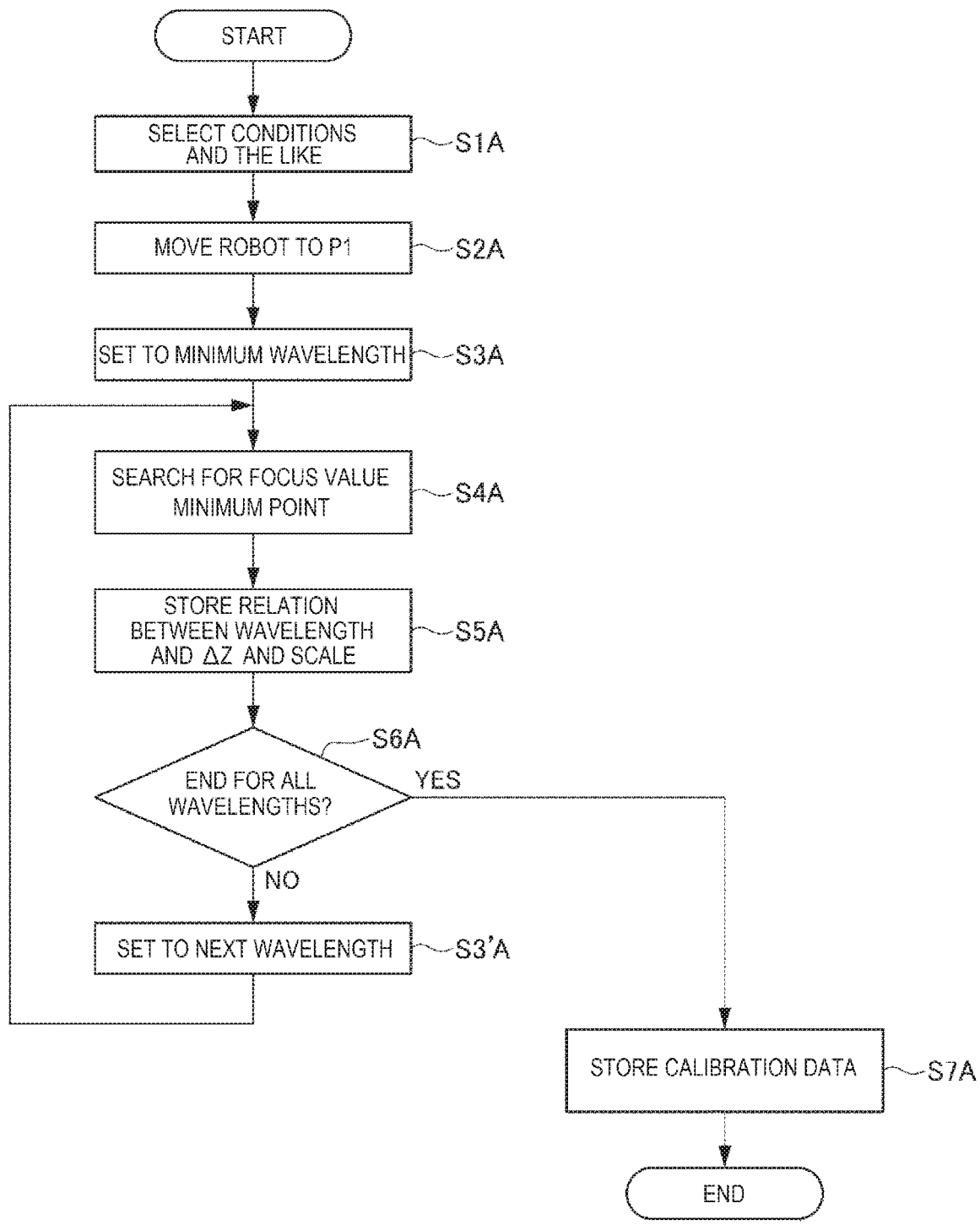
FIG. 13 is a flowchart at the time when the adjustment processing included in the section method for inspecting surface properties of an article is carried out by the robot system shown in FIG. 5.
Figures 14, 15:
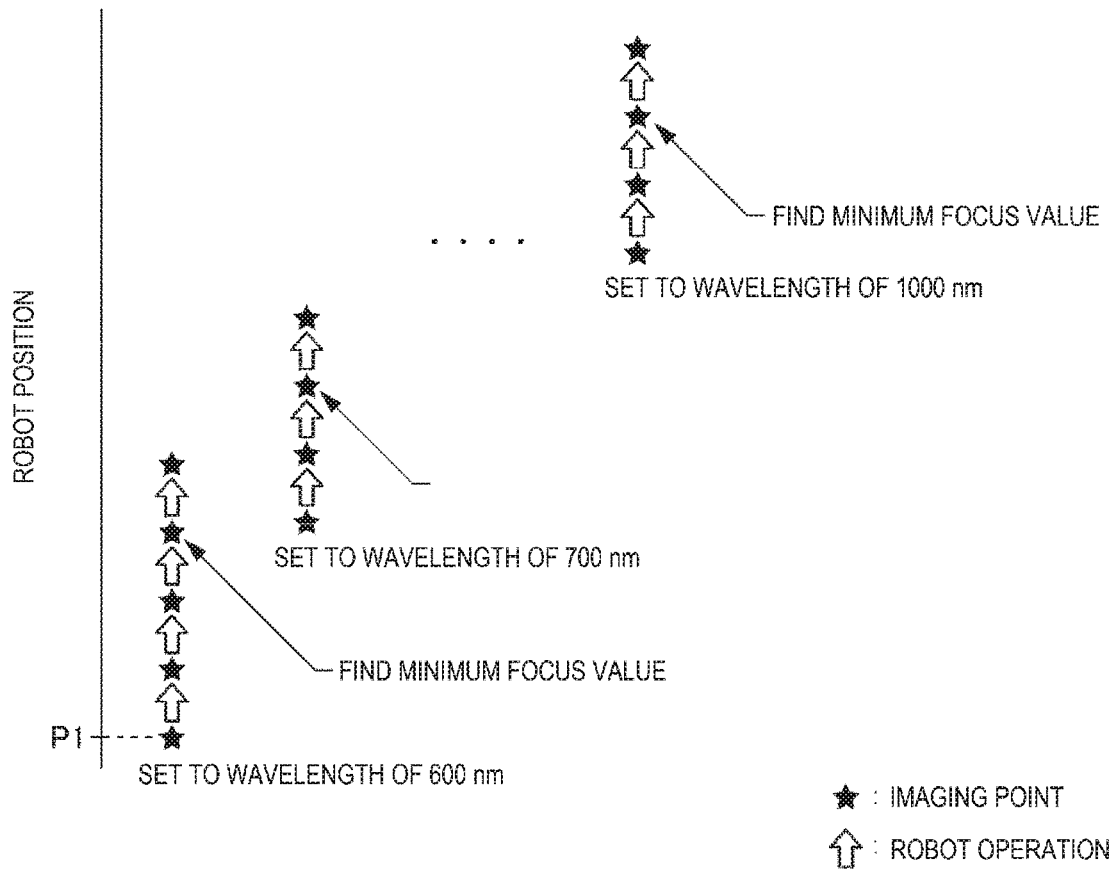
FIG. 14 is a schematic diagram for explaining a method of determining in-focus positions at wavelengths.
FIG. 15 is a table showing an example of a relation between wavelengths and deviation amounts ΔZ of in-focus positions determined at the wavelengths from a position P1 and magnifications of spectral images acquired at the wavelengths.
Figure 17:
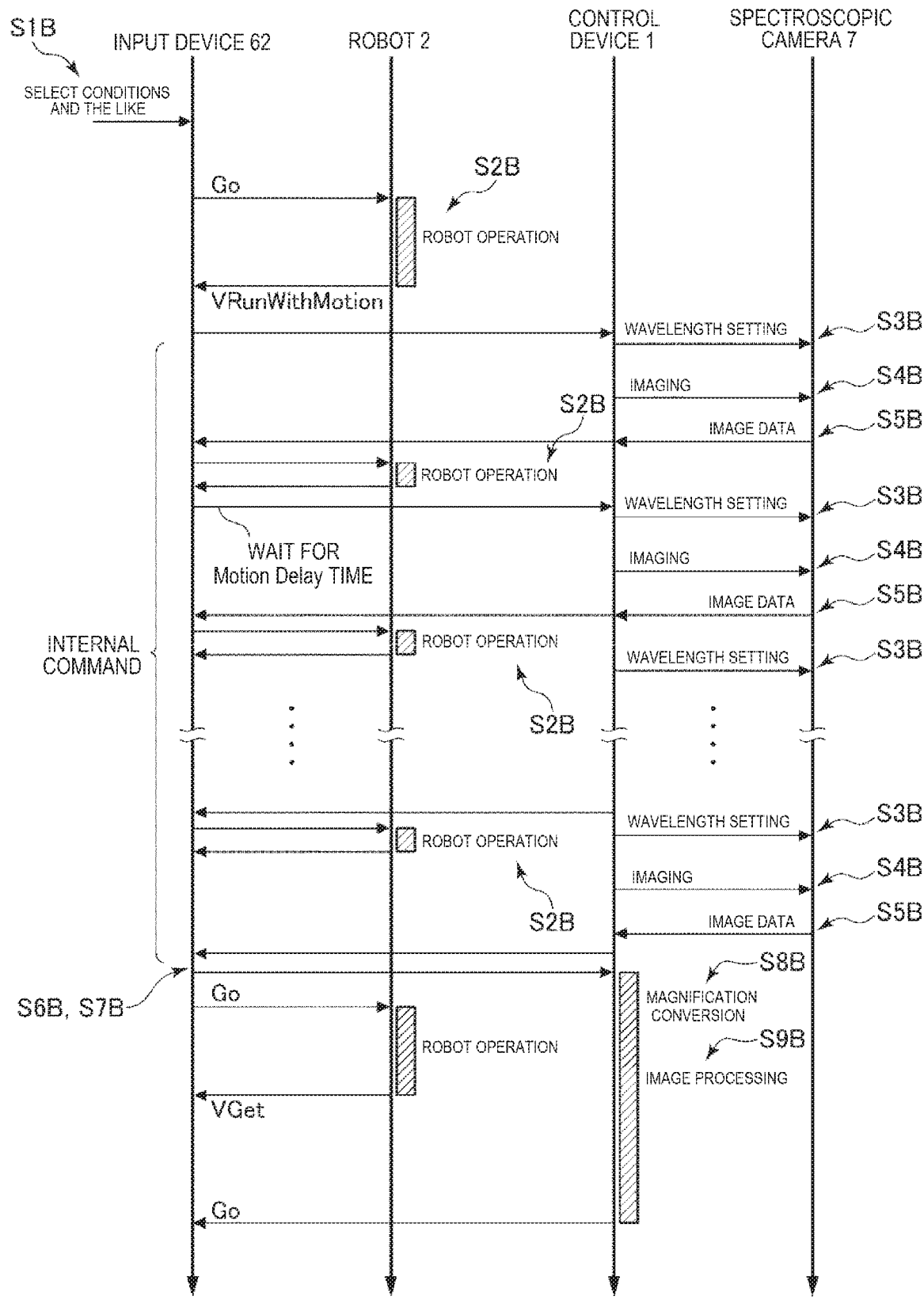
FIG. 17 is a timing chart at the time when the inspection processing included in the inspection method for inspecting surface properties of an article is carried out by the robot system shown in FIG. 4.
Figure 18:
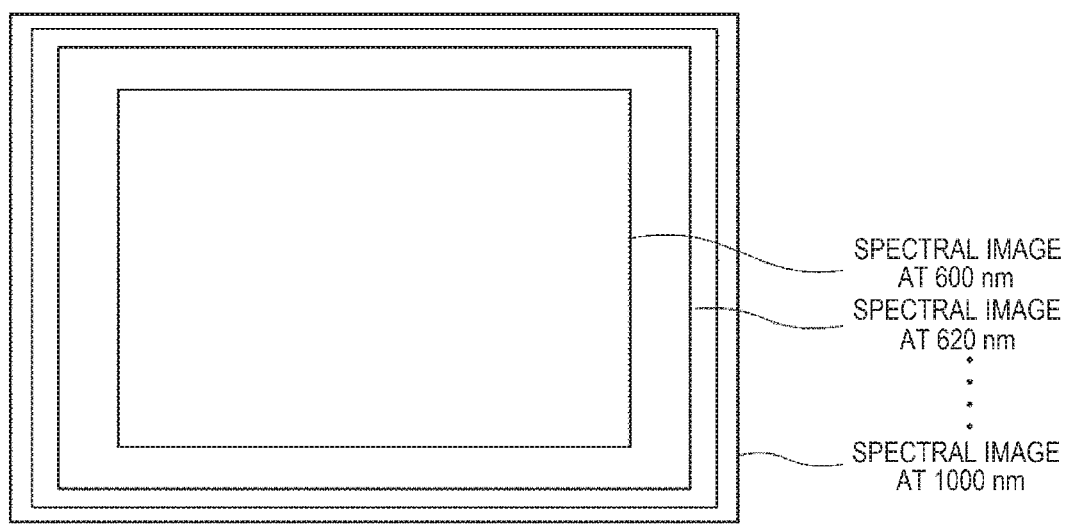
FIG. 18 is a schematic diagram showing a state in which spectral images subjected to magnification conversion for the wavelengths are superimposed.
Figure 19:
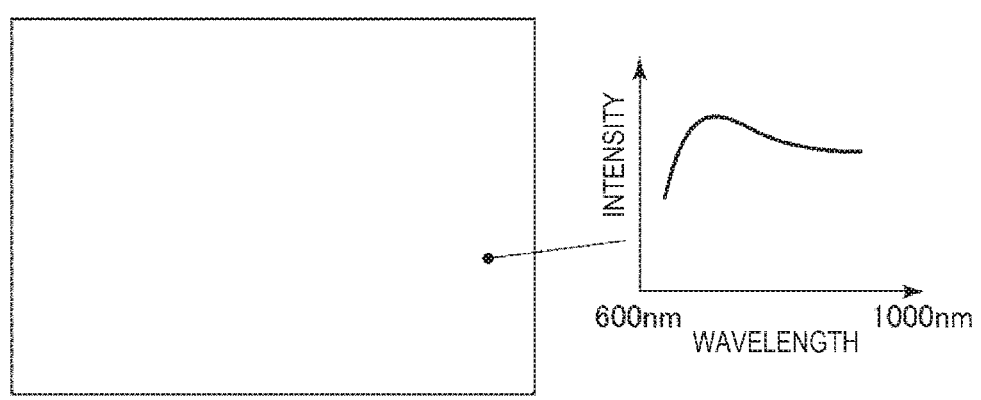
FIG. 19 is a schematic diagram showing spectrum information obtained by superimposing the spectral images subjected to the magnification conversion for the wavelengths.

FIG. 7 is a schematic diagram showing an in-focus position and a wavelength of light transmitted through the variable wavelength interference filter. FIG. 8 is a graph showing the relation between the in-focus position and the wavelength of the light transmitted through the variable wavelength interference filter. FIG. 9 is a graph showing a relation between the wavelength of the light transmitted through the variable wavelength interference filter and the magnification of a spectral image obtained at the wavelength. FIG. 10 is a schematic diagram for explaining overviews of adjustment processing and inspection processing carried out by the inspection method for inspecting surface properties of an article. FIG. 11 is a schematic diagram for explaining the adjustment processing carried out by the inspection method for inspecting surface properties of an article. FIG. 12 is a schematic diagram for explaining the adjustment processing carried out by the inspection method for inspecting surface properties of an article. FIG. 13 is a flowchart of the adjustment processing included in the section method for inspecting the surface properties of the article is carried out by the robot system shown in FIG. 5. FIG. 14 is a schematic diagram for explaining a method of determining in-focus positions at wavelengths. FIG. 15 is a table showing an example of a relation between wavelengths and deviation amounts $\Delta Z$ of in-focus positions determined at the wavelengths from a position P1 and magnifications of spectral images acquired at the wavelengths. FIG. 16 is a schematic diagram showing an example of conditions input when the inspection processing included in the inspection method for inspecting surface properties of an article is carried out by the robot system shown in FIG. 4. FIG. 17 is a timing chart in carrying out, with the robot system shown in FIG. 4, the inspection processing included in the inspection method for inspecting surface properties of an article. FIG. 18 is a schematic diagram showing a state in which spectral images subjected to magnification conversion for the wavelengths are superimposed. FIG. 19 is a schematic diagram showing spectrum information obtained by superimposing the spectral images subjected to the magnification conversion for the wavelengths.

The inspection method using the robot system 100 includes an imaging step for changing the distance between the object X set on the workbench 8 and the spectroscopic camera 7 in the optical axis direction of the spectroscopic camera 7, acquiring, at a first wavelength, a first spectral image at the first wavelength in a first position where the spectroscopic camera 7 is focused on the object X, and acquiring, at a second wavelength longer than the first wavelength, a second spectral image at the second wavelength in a second position where the spectroscopic camera 7 is focused on the object X and a superimposing step for enlarging the second spectral image to adjust the size of the object X included in the second spectral image to be the same as the size of the object X included in the first spectral image and thereafter superimposing the enlarged second spectral image on the first spectral image to acquire a spectrum image.

The reflectance of light in the projection lens 812 included in the spectroscopic camera 7 is different at respective wavelengths as shown in FIG. 7 between the case in which light having a short wavelength of 600 nm is transmitted by the spectroscopic section 41, which is the variable wavelength interference filter, and the case in which light having a long wavelength of 1000 nm is transmitted by the spectroscopic section 41. For convenience of explanation, in FIG. 7, illustration of lenses other than the projection lens 812 included in the spectroscopic camera 7 is omitted.

Accordingly, when the light having the wavelength of 600 nm is transmitted to obtain a spectral image with the imaging element 71 and when the light having the wavelength of 1000 nm is transmitted to obtain a spectral image with the imaging element 71, if a focal length between the projection lens 812 and the imaging element 71 is fixed, as shown in FIGS. 7 and 8, an in-focus position on an article to be inspected, that is, the object X is different in that the in-focus position is near when the light having the wavelength of 600 nm is transmitted and is far when the light having the wavelength of 1000 nm is transmitted.

Since the in-focus position is different when the light having the wavelength of 600 nm is transmitted and when the light having the wavelength of 1000 nm is transmitted, as shown in FIG. 9, the magnification, that is, the magnitude of the spectral image obtained when the light having the wavelength of 600 nm is transmitted is large compared with the magnification, that is, the magnitude of the spectral image obtained when the light having the wavelength of 1000 nm is transmitted, that is, chromatic aberration of magnification occurs.

Therefore, if the spectral images captured at the different wavelengths are directly superimposed, a spectral image including the chromatic aberration of magnification in which positional deviation occurs between the superimposed spectral images is generated.

On the other hand, in this inspection method, spectral images having matching focuses are acquired for each of different wavelengths by the imaging step for acquiring spectral images at the different wavelengths in an in-focus position of the object X with the spectroscopic camera 7 while relatively moving the object X set on the workbench 8 and the spectroscopic camera 7 in the optical axis direction of the spectroscopic camera 7. Thereafter, the magnifications of the spectral images are matched and the spectral images are superimposed by the superimposing step for enlarging the spectral images with respect to a spectral image acquired at a minimum wavelength to adjust the size of the object X included in the spectral images to be the same and thereafter superimposing the enlarged spectral images to acquire spectrum information of a spectrum image. Therefore, positional deviation does not occur among the superimposed spectral images. A spectral image not including chromatic aberration of magnification can be obtained. Accordingly, it is possible to carry out, for a produced article or an article being produced, an inspection of surface properties of the article with excellent accuracy. "The size of the object X in the spectral images is the same" means that a difference between a region occupied by the object X in the spectral image and a region occupied by the object X in another spectral image, which is a comparison target, is within a predetermined range. An element, the size of which is compared, is not limited to the region and may be a contour, the number of pixels, and a matching degree of the object X with respect to reference shape data.

Incidentally, in such an inspection method according to the present disclosure, that is, an inspection method for inspecting surface properties of an article, adjustment processing for performing adjustment of a focus with respect to a mark such as a letter like L or T in advance to determine a relation between a wavelength of light transmitted by the spectroscopic section 41, that is, the spectroscopic camera 7 and an in-focus position of the projection lens 812, that is, the spectroscopic camera 7 and the magnification of a spectral image obtained by the imaging element 71 is carried out and, thereafter, inspection processing for inspecting surface properties of an article disposed in Spectrum Match01 or Spectrum Match02, which is a predetermined region, is carried out (see FIG. 10).

Therefore, in the following explanation, the adjustment processing and the inspection processing in the inspection method are explained in order.

Adjustment Processing

First, the adjustment processing in the inspection method for inspecting surface properties of an article is explained. The adjustment processing is carried out in a state in which the personal computer 3 is attached to the control device 1 included in the robot system 100 as explained above.

<1A> First, as shown in FIG. 13, the user operates the input device 36 included in the personal computer 3 to start a program of aberration correction calibration for carrying out the adjustment processing for determining a relation between a wavelength of light transmitted by the spectroscopic section 41, that is, the spectroscopic camera 7 and an in-focus position of the projection lens 812, that is, the spectroscopic camera 7 and the magnification of a spectral image obtained by the imaging element 71 and thereafter selects conditions and the like when necessary according to an instruction of the program (S1A).

Examples of the conditions input according to the instruction of the program include, when a plurality of spectroscopic cameras 7 are set in the robot 2, designation of the spectroscopic camera 7 that performs measurement, a setting position of the spectroscopic camera 7, a time until imaging by the spectroscopic camera 7 is started after movement of the spectroscopic camera 7 by the robot 2, a minimum wavelength, a maximum wavelength, and a pitch of a wavelength of light transmitted by the spectroscopic section 41, a position P1 where the spectroscopic camera 7 is set, and a maximum distance of movement from the position P1.

<2A> Subsequently, the user determines a relation between the minimum wavelength of the light transmitted by the spectroscopic section 41, that is, a shortest wavelength and an in-focus position of the projection lens 812, that is, the spectroscopic camera 7 and the magnification of a spectral image obtained by the imaging element 71. That is, the user specifies an in-focus position of the spectroscopic camera 7 and the magnification of a spectral image obtained by the imaging element 71 at the time when the light having the minimum wavelength is transmitted by the spectroscopic section 41.

<2A-1> First, according to an input instruction by the user in the input device 36, the aberration-correction-calibration executing section 303 included in the personal computer 3 moves the shaft 241 of the robot 2 in the z-axis direction according to the operation of the camera-point correcting section 102 included in the robot control section 11 to move the spectroscopic camera 7 to the position P1, which is an initial setting position, as shown in FIG. 14 (S2A).

<2A-2> Subsequently, the aberration-correction-calibration executing section 303 sets the wavelength of the light transmitted by the spectroscopic section 41 to a minimum wavelength, that is, in FIGS. 14 and 15, 600 nm according to the operation of the spectroscopic control section 602 included in the camera control section 60 (S3A).

The setting by the spectral-image processing section 12 of the wavelength of the light transmitted by the spectroscopic section 41 is carried out by acquiring, based on the V-λ data stored in the storing section 14, a voltage value (an input value) of a driving voltage corresponding to the wavelength of the light to be transmitted, that is, a spectral wavelength of light to be emitted and thereafter applying the acquired voltage value to the electrostatic actuator 45 of the Fabry-Perot etalon filter functioning as the spectroscopic section 41.

<2A-3> Subsequently, the aberration-correction-calibration executing section 303 repeatedly acquires a spectral image with the imaging element 71 according to the operation of the spectral-image acquiring section 603 included in the camera control section 60 and moves the spectroscopic camera 7 in the z-axis direction according to the operation of the camera-point correcting section 102 included in the robot control section 11 to specify an in-focus position, in other words, a focus value minimum point at the time when the wavelength of the light transmitted by the spectroscopic section 41 is the minimum wavelength, that is, 600 nm (S4A). The in-focus position is determined as a point where a focus value representing a focusing degree is minimized. For example, there is a method of setting, as an indicator, the number of pixels of a region where a luminance gradient is a fixed luminance gradient or more and determining the in-focus position as a point where the indicator is minimized. An average number of pixels in width in which a contour of an article is blurred may be set as an indicator and the in-focus position may be determined as a point where the indicator is minimized.

The focus value minimum point can be specified by, as shown in FIG. 14, for example, after moving the spectroscopic camera 7 in the +z-axis direction, that is, the upward direction, at a small interval from the position P1 where the spectroscopic camera 7 is set first, repeatedly carrying out Focus Test sequence execution for carrying out acquisition of a spectral image in the imaging element 71 by the operation of the spectral-image acquiring section 603 and image processing for the spectral image acquired by the operation of the spectrum-information generating section 604.

More specifically, in the image processing for the acquired spectral image, in a model of Geom01 shown in FIG. 11, after an image of a letter L in the figure is detected, the image of the letter L is analyzed, and, in spectral images acquired in respective positions, a position where the number of pixels occupied by a frame, that is, a boundary part of the letter L is minimum is specified as the in-focus position, that is, the focus value minimum point.

As explained above, spectral images including the object X set on the work bench 8, that is, the letter L serving as a mark are continuously acquired by the spectroscopic camera 7 at the minimum wavelength in a state in which the distance between the letter L and the spectroscopic camera 7 is changed in the optical axis direction of the spectroscopic camera 7. A position where a spectral image with a minimum number of pixels occupied by the boundary part of the letter L in the spectral image is acquired is specified as an in-focus position.

In specifying the focus value minimum point, as explained above, it is desirable to set the position P1 as the minimum point and move the shaft 241, that is, the spectroscopic camera 7 included in the robot 2 upward from the minimum point. Accordingly, it is desirable to set the position P1 in an in-focus position at the minimum wavelength or a position slightly lower than the in-focus position. That is, it is desirable to dispose the spectroscopic camera 7 with respect to the letter L serving as the object X in a position closer than the in-focus position and, thereafter, move the spectroscopic camera 7 away from the letter L along the optical axis direction, that is, change the distance between the spectroscopic camera 7 and the letter L to be longer. Consequently, the shaft 241 and the spectroscopic camera 7 do not need to come closer to the object X side than the position P1. The spectroscopic camera 7 and the object X are unlikely to collide. Therefore, improvement of safety is achieved.

The focus value minimum point is not limited to be specified by performing the analysis for the image of the letter L and can also be specified by calculating the number of pixels occupied by a boundary part of an outer frame formed in a circle as shown in FIG. 12.

<2A-4> Subsequently, the aberration-correction-calibration executing section 303 causes the storing section 14 to store a deviation amount ΔZ from the position P1 of the focus value minimum point at the time when the wavelength of the light transmitted by the spectroscopic section 41 is the minimum wavelength, that is, 600 nm and store, as 1, the magnification of a spectral image acquired at the deviation amount ΔZ (S5A).

<3A> Subsequently, after specifying the focus value minimum point in the light having the minimum wavelength, the aberration-correction-calibration executing section 303 determines, based on the conditions selected by the user in the step <1A>, that is, the minimum wavelength, the maximum wavelength, and a selected pitch of the wavelength of the light transmitted by the spectroscopic section 41, whether it is necessary to specify the focus value minimum point in light having a wavelength longer than the wavelength of the light having the minimum wavelength. That is, the aberration-correction-calibration executing section 303 determines that it is necessary to continuously specify, in a wavelength region from the light having the minimum wavelength to the light having the longest wavelength, at a pitch obtained by dividing the wavelength region by the width of a fixed wavelength, the focus value minimum point in light having the wavelength and, at a point in time when the light has a wavelength exceeding the maximum wavelength, that is, a longest wavelength, finishes specifying the focus value minimum point (S6A).

When it is necessary to specify, in the determination (S6A), the focus value minimum point in light having a wavelength longer than the wavelength of the light having the wavelength in which the focus value minimum point is specified, the aberration-correction-calibration executing section 303 operates the spectroscopic control section 602 such that light having a wavelength added with a pitch set by the user, that is, in FIGS. 14 and 15, 100 nm can be transmitted by the spectroscopic section 41 (S3'A) and thereafter repeatedly carries out the step <2A> to this step <3A>. Consequently, the focus value minimum point, that is, the in-focus position in the light having the wavelength longer than the wavelength of the light having the wavelength in which the focus value minimum point is specified is specified. The aberration-correction-calibration executing section 303 repeatedly specifies the focus value minimum point in the light having the minimum or larger wavelength from the minimum wavelength to the maximum wavelength at a fixed pitch, that is, in FIGS. 14 and 15, from 600 nm to 1000 nm at a pitch of 100 nm.

As explained above, by repeatedly carrying out the step <2A> to this step <3A>, it is possible to obtain the deviation amount ΔZ from the position P1 of the focus value minimum point at the time when the light having the minimum wavelength to the light having the maximum wavelength are transmitted by the spectroscopic section 41 at the fixed pitch and the magnification of a spectral image at this time.

That is, a relation between the wavelengths at the time when the light transmitted by the spectroscopic section 41 is changed from the minimum wavelength of 600 nm to the maximum wavelength 1000 nm at the pitch of 100 nm and the deviation amount ΔZ from the position P1 of the focus value minimum point and the magnification of the spectral image at this time is as shown in FIG. 15.

On the other hand, when the light has a wavelength exceeding the maximum wavelength and it is unnecessary to specify the focus value minimum point in the light having the wavelength, the aberration-correction-calibration executing section 303 ends the repetition of the step <2A> to this step <3A> and shifts to the next step <4A>.

<4A> Subsequently, the aberration-correction-calibration executing section 303 causes the storing section 14 to store, once again, the deviation amount ΔZ from the position P1 of the focus value minimum point and the magnification of the spectral image obtained at this time, which are repeatedly specified until the wavelength of the light transmitted by the spectroscopic section 41 changes from the minimum wavelength to the maximum wavelength at the fixed pitch, as calibration data indicating a relation between the wavelengths of the light transmitted by the spectroscopic section 41 and the deviation amount ΔZ from the point P1 of the focus value minimum point and the magnification of the spectral image obtained at this time (S7A).

That is, as shown in FIGS. 14 and 15, when the light transmitted by the spectroscopic section 41 is changed from the minimum wavelength of 600 nm to the maximum wavelength of 1000 nm at the pitch of 100 nm, the aberration-correction-calibration executing section 303 causes the storing section 14 to store a relation between the wavelengths and the deviation amount Δz from the position P1 of the focus value minimum point and the magnification of the spectral image at this time shown in FIG. 16 as calibration data.

As explained above, through the adjustment processing for adjusting a focus, that is, the step <1A> to the step <4A>, it is possible to determine a relation between the wavelength of the light transmitted by the spectroscopic section 41, that is, the spectroscopic camera 7 and the in-focus position of the projection lens 812 and the spectroscopic camera 7 and the magnification of the spectral image obtained by the imaging element 71, that is, the spectroscopic camera 7.

In other words, the adjustment processing for adjusting a focus explained above configures an adjustment process for specifying, at different wavelengths, a relation between the wavelengths and an in-focus position of an acquired spectral image and the magnification of the spectral image, that is, specifying, at a set wavelength received in advance, a relation between a position where the spectroscopic camera 7 is focused on the object X and the magnification of a spectral image acquired in the position.

Subsequently, inspection processing for inspecting surface properties of an article disposed in Spectrum Match01 or Spectrum Match02, which is the predetermined region, is carried out using the robot system 100 in which the adjustment processing for adjusting a focus is carried out.

Inspection Processing

Inspection processing in an inspection method for inspecting surface properties of an article is explained. The inspection processing is usually carried out in a state in which the personal computer 3 is detached from the control device 1 included in the robot system 100. A spectral image processing apparatus is configured by the robot system 100 from which the personal computer 3 is detached, that is, the robot 2, the spectroscopic camera 7, and the control device 1.

<1B> First, as shown in FIG. 17, the user operates the input device 62 to thereby start a program for carrying out inspection processing for inspecting surface properties of an article disposed in a predetermined region and thereafter selects conditions and the like when necessary according to an instruction of the program (S1B).

Examples of the conditions input according to the instruction of the program include designating in which of regions where surface properties of the article are inspected, specifically, the regions of Spectrum Match01 and Spectrum Match02 the inspection is carried out, designating a type of the inspection for inspecting surface properties of the article, specifically, which of a color of the article and presence or absence of foreign matters adhering to the article is inspected, positions where the spectroscopic camera 7 is disposed when the inspection is started and when the inspection is ended, a time of standby until acquisition of a spectral image of the article by the spectroscopic camera 7 after movement of the spectroscopic camera 7 by the robot 2, and a wavelength region in acquiring the spectral image of the article with the spectroscopic camera 7 and a pitch for changing a wavelength in the wavelength region (see FIG. 16).

<2B> Subsequently, a spectral image is acquired by the imaging element 71, that is, the spectroscopic camera 7 at a set pitch in the wavelength region set in the step <1B> based on the relation between the wavelength of the light transmitted by the spectroscopic section 41, that is, the spectroscopic camera 7 and the in-focus position of the projection lens 812, that is, the spectroscopic camera 7 and the magnification of the spectral image obtained by the imaging element 71, that is, the spectroscopic camera 7 acquired in the adjustment processing explained above.

<2B-1> First, according to an input instruction by the user in the input device 62, the image-processing executing section 65 moves the shaft 241 in the z-axis direction, that is, the optical axis direction according to the operation of the camera-point correcting section 102 included in the robot control section 11 to dispose the spectroscopic camera 7 in a position P0 and thereafter moves the shaft 241 to a position where the spectroscopic camera is focused at a minimum wavelength, that is, a first wavelength in the wavelength region set in the step <1B>, that is, in FIGS. 18 and 19, a position at the deviation amount ΔZ of 5 mm from the position P1 where the spectroscopic camera 7 is focused at 600 nm (S2B).

The spectroscopic camera 7 can be moved in the optical axis direction with respect to the object X by such driving of the shaft 241, that is, the robot arm 20. That is, the distance between the spectroscopic camera 7 and the object X in the optical axis direction can be changed.

<2B-2> Subsequently, the image-processing executing section 65 sets, according to the operation of the spectroscopic control section 602 included in the camera control section 60, the wavelength of the light transmitted by the spectroscopic section 41 to the minimum wavelength in the wavelength region set in the step <1B>, that is, in FIGS. 18 and 19, 600 nm (S3B).

The setting of the wavelength of the light transmitted by the spectroscopic section 41 by the spectral-image processing section 12 is carried out by acquiring, based on the V-λ data stored in the storing section 14, a voltage value (an input value) of a driving voltage corresponding to the wavelength of the light to be transmitted, that is, a spectral wavelength of light to be emitted and thereafter applying the acquired voltage value to the electrostatic actuator 45 of the Fabry-Perot etalon filter functioning as the spectroscopic section 41.

<2B-3> Subsequently, the image-processing executing section 65 acquires a spectral image, that is, a first spectral image with the imaging element 71 according to the operation of the spectral-image acquiring section 603 included in the camera control section 60 (S4B).

In a model of Geom02 shown in FIG. 10, a spectral image is acquired by the imaging element 71 such that the article disposed in the region of Spectrum Match01 or Spectrum Match02 in the figure is included in the spectral image.

<2B-4> Subsequently, the image-processing executing section 65 causes the storing section 14 to store the spectral image focused by the spectroscopic camera 7 acquired in the step <2B-3> and the fact that the wavelength of the light at which the spectral image is acquired is a minimum wavelength (a first wavelength), that is, 600 nm, and the magnification of a spectral image (a first spectral image) acquired at this time is 1 (S5B).

<3B> Subsequently, the image-processing executing section 65 determines, based on the conditions selected by the user in the step <1B>, that is, the minimum wavelength, the maximum wavelength, and the pitch of the wavelength of the light transmitted by the spectroscopic section 41, whether acquisition of a spectral image by the spectroscopic camera 7 in an in-focus position of the spectroscopic camera 7 in light having a wavelength longer than the wavelength of the light having the minimum wavelength is necessary after the acquisition of the spectral image by the spectroscopic camera 7 in the in-focus position of the spectroscopic camera 7 in the light having the minimum wavelength. That is, the image-processing executing section 65 determines that it is necessary to continuously carry out, from the light having the minimum wavelength to the light having the maximum wavelength at a pitch of a selected wavelength, the acquisition of the spectral image in the in-focus position of the spectroscopic camera 7 in the light having the wavelength and ends the acquisition of the spectral image in the light having the wavelength at a point in time when the light exceeds the maximum wavelength (S6B).

Figure 20:
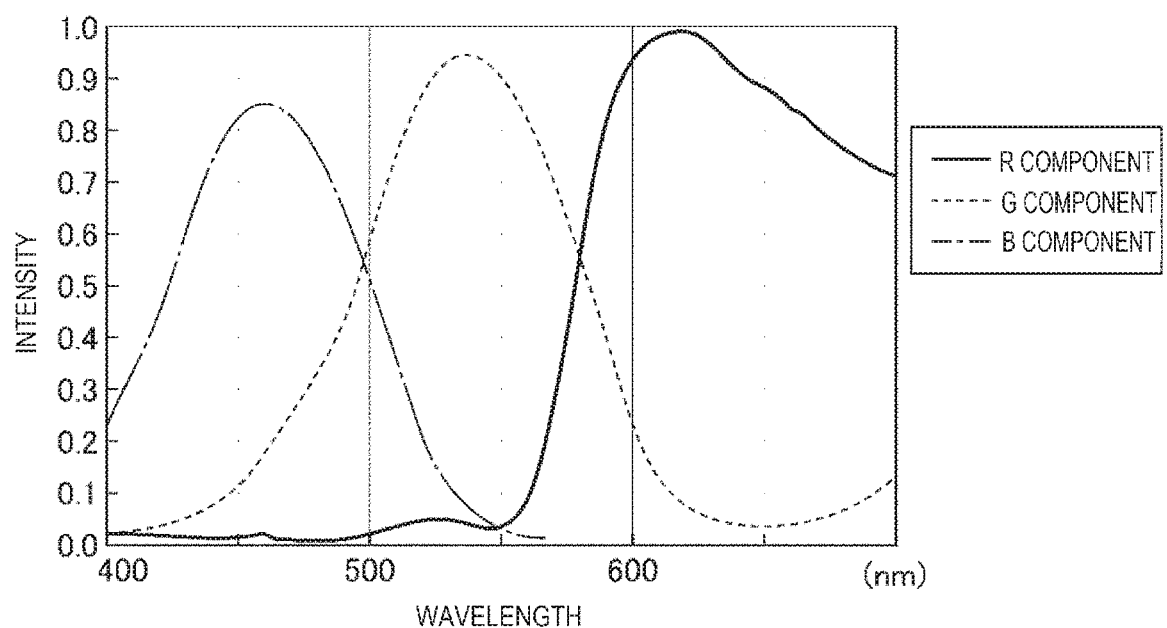
FIG. 20 is a graph showing a spectral sensitivity curve of an RGB camera.

In the determination (S6B), when it is necessary to acquire a spectral image (a second spectral image) by the spectroscopic camera 7 in the in-focus position in light having a wavelength (a second wavelength) longer than the wavelength of the light in which the spectral image is acquired by the spectroscopic camera 7 in the in-focus position, the image-processing executing section 65 operates the spectroscopic control section 602 such that light having a wavelength added with a pitch set by the user, that is, in FIGS. 18 and 19, 20 nm can be transmitted by the spectroscopic section 41. Thereafter, the image-processing executing section 65 repeatedly carries out the step <2B> to this step <3B>. Consequently, the acquisition of the spectral image by the spectroscopic camera 7 in the in-focus position in the light having the wavelength longer than the wavelength of the light having the wavelength in which the spectral image is acquired by the spectroscopic camera 7 in the in-focus position is carried out. The image-processing executing section 65 repeatedly carries out the acquisition of the spectral image by the spectroscopic camera 7 in the in-focus position in the light having the minimum or larger wavelength from the minimum wavelength to the maximum wavelength at a fixed pitch in the wavelength region selected by the user in the step <1B>, that is in FIGS. 18 and 19, from 600 nm to 1000 nm at a pitch of 20 nm.

In this way, the minimum wavelength for acquiring the spectral image, the maximum wavelength for acquiring the spectral image, and the pitch of the wavelength for acquiring the spectral image between the minimum wavelength and the maximum wavelength are set. The acquisition of the spectral image by the spectroscopic camera 7 in the in-focus position is sequentially carried out from the minimum wavelength to the maximum wavelength at an interval of the pitch. That is, a wavelength region from a shortest wavelength to a longest wavelength for acquiring the spectral image and a pitch for dividing the wavelength region by a fixed wavelength are set. The acquisition of the spectral image by the spectroscopic camera 7 is carried out based on the shortest wavelength, the longest wavelength, and the pitch in a state in which the distance between the spectroscopic camera 7 and the object X is sequentially changed from the shortest wavelength to the longest wavelength at the interval of the pitch such that the spectroscopic camera 7 is in an in-focus position. Consequently, it is possible to acquire a spectra spectrum image with high accuracy including information concerning spectral images at wavelengths at a fixed interval.

By changing the wavelength for acquiring the spectral image from the minimum wavelength to the maximum wavelength at the interval of the pitch, it is possible to move the spectroscopic camera 7 away from the object X along the optical axis direction, that is, change the distance between the spectroscopic camera 7 and the object X to be longer. Consequently, it is possible to surely prevent the object X from coming into contact with the spectroscopic camera 7.

The pitch of the wavelength for acquiring the spectral image is set to 20 nm in the above explanation. However, not only this, but the pitch of the wavelength may be 20 nm or more and 20 nm or less if a relation between the wavelength of the light transmitted by the spectroscopic camera 7 and the in-focus position of the spectroscopic camera 7 and the magnification of the spectral image obtained by the spectroscopic camera 7 is clear and the relation is satisfied.

By repeatedly carrying out the step <2B> to this step <3B> as explained above, spectral images in the light having the minimum wavelength to the light having the maximum wavelength at a fixed pitch can be acquired as focused spectral images in the wavelength region selected by the user in the step <1B>.

That is, as shown in FIGS. 18 and 19, spectral images at the time when the light transmitted by the spectroscopic section 41 is changed from the minimum wavelength of 600 nm to the maximum wavelength of 1000 nm at the pitch of 20 nm can be acquired as focused spectral images. A relation between the spectral images at the wavelengths acquired in this way and the magnifications of the spectral images is also made clear through the adjustment processing.

On the other hand, the light exceeds the maximum wavelength and it is unnecessary to acquire a spectral image in an in-focus position in the light having the wavelength, the image-processing executing section 65 ends the repetition of the step <2B> to this step <3B> and shifts to the next step <4B>.

The repetition of the step <2B> to this step <3B> explained above configures an imaging process for changing the distance between the object X set on the workbench 8 and the spectroscopic camera 7 in the optical axis direction of the spectroscopic camera 7, acquiring, with the spectroscopic camera 7, the first spectral image at the first wavelength in the first position where the spectroscopic camera 7 is focused on the object X at the first wavelength, and acquiring the second spectral image at the second wavelength longer than the first wavelength in the second position where the spectroscopic camera 7 is focused at the second wavelength.

<4B> Subsequently, the image-processing executing section 65 causes the storing section 14 to store, once again, as spectral image data of an article to be inspected, the spectral images focused by the spectroscopic camera 7 repeatedly acquired until the wavelength of the light transmitted by the spectroscopic section 41 changes from the minimum wavelength to the maximum wavelength at the fixed pitch in the wavelength region selected by the user in the step <1B>, the wavelength of the light at which the spectral image is acquired, and the magnification of the spectral image at the wavelength at which the spectral image is acquired (S7B).

That is, as shown in FIGS. 18 and 19, when spectral images focused by the spectroscopic camera 7 are acquired at the minimum wavelength of 600 nm to the maximum wavelength of 1000 nm at the pitch of 20 nm, the image-processing executing section 65 causes the storing section to store, together with these spectral images, wavelengths of the light corresponding to the spectral images and magnifications of the spectral images at the wavelengths as spectral image data of the article to be inspected.

As explained above, through the step <1B> to the step <4B>, it is possible to acquire spectral images focused by the spectroscopic camera 7 from the minimum wavelength to the maximum wavelength at the fixed pitch in the wavelength region selected by the user and determine magnifications of the spectral images at the wavelengths.

<5B> Subsequently, the magnification adjusting section 605 included in the spectrum-information generating section 604 included in the image-processing executing section 65 acquires the spectral image data of the article to be inspected stored in the storing section 14, that is, the spectral images focused by the spectroscopic camera 7 repeatedly acquired from the minimum wavelength to the maximum wavelength at the fixed pitch in the wavelength region selected by the user, wavelengths of light at which the spectral images are acquired, and magnifications of the spectral images at the wavelengths at which the spectral images are acquired. The magnification adjusting section 605 multiplies the spectral images corresponding to the wavelengths respectively by inverses of the magnifications of the spectral images corresponding to the wavelengths (S8B). Consequently, as the spectral images subjected to magnification conversion for the wavelengths, as shown in FIG. 18, the spectral image at the minimum wavelength, that is, 600 nm is obtained as a smallest spectral image and a spectral image at the maximum wavelength of 1000 nm is obtained as a largest spectral image. As a result, the object X imaged in the spectral images at the wavelengths can be shown as having the same size.

<6B> Subsequently, the spectrum-information generating section 604 included in the image-processing executing section 65 can obtain a spectrum image Ssam by superimposing, with a point corresponding to an optical axis along the z-axis direction set as a visual field center and with the visual field center set as a reference point, the spectral images enlarged, that is, the spectral images subjected to magnification conversion respectively at the wavelengths as shown in FIGS. 18 and 19 (S9B).

For a spectral image at another wavelength, the magnification of which is less than 1 with the spectral image at the minimum wavelength set as a reference, the magnification of which is 1, a region located on the outer side of the reference spectral image is trimmed. Consequently, as shown in FIG. 18, the spectrum image Ssam can be obtained by superimposing the spectral images at the wavelengths subjected to the magnification conversion as images in the same visual field.

As explained above, when the spectrum image Ssam is obtained by superimposing the spectral images acquired at the wavelengths, the spectral images subjected to the magnification conversion are superimposed considering the magnitudes of the spectral images at the wavelengths. Accordingly, it is possible to accurately suppress or prevent positional deviation from occurring among the superimposed spectral images. Therefore, it is possible to obtain the spectrum image Ssam in which chromatic aberration of magnification is accurately suppressed or prevented from being included.

The step <5B> to this step <6B> explained above configure a superimposing step for enlarging the second spectral image such that the size of the object X included in the second spectral image is the same as the size of the object X included in the first spectral image and thereafter superimposing the enlarged second spectral image on the first spectral image to acquire a spectrum image.

The spectral images at the wavelengths are acquired by, with the z-axis direction set as the optical axis direction, moving the spectroscopic camera 7 in the z-axis direction as explained above. Accordingly, simply by superimposing the spectral images with the center of the optical axis along the z-axis direction set as the visual field center, it is possible to obtain the spectrum image Ssam in a state in which positional deviation is accurately suppressed or prevented from occurring among the spectral images at the wavelengths. That is, it is possible to easily carry out the superimposition of the spectral images at the wavelengths in the state in which positional deviation is accurately suppressed or prevented from occurring. Therefore, it is possible to easily acquire the spectrum image Ssam obtained by the superimposition. Since the spectrum image Ssam of the object X, that is, the produced article or the article being produced can be accurately obtained as accurate spectrum information in this way, it is possible to inspect surface properties in the produced article or the article being produced with excellent accuracy.

When the spectrum image Ssam is obtained in this step <6B>, since the operation of the robot 2 is not involved, the camera-point correcting section 102 desirably moves, considering processing after the end of the inspection processing, the shaft 241 in the z-axis direction with respect to the second arm 23 to, for example, dispose the spectroscopic camera 7 in a position P10.

<7B> Subsequently, the spectrum-information generating section 604 inspects, based on the obtained spectrum image Ssam, that is, spectrum information, surface properties of the article to be inspected, that is, the object X (an inspection process).

In other words, the spectrum-information generating section 604 acquires the spectrum image Ssam obtained in the step <6B>. Thereafter, the spectrum-information generating section 604 uses the spectrum image Ssam, which is spectral information, as a feature value and carries out analysis processing for comparing the feature value with a database to inspect surface properties of the object X, which is the article to be inspected.

Specifically, the spectrum-information generating section 604 acquires data r of an article determined as a non-defective product from surface properties stored in the storing section 14 in advance and discriminates, using the data r, whether the spectrum image Ssam of the object X coincides with the data r to inspect surface properties of the object X.

More specifically, first, the spectrum-information generating section 604 projects the spectrum image Ssam serving as the feature value to a discrimination space suitable for discriminating whether the spectrum image Ssam coincides with the data r. That is, the spectrum-information generating section 604 generates a projection function f(•) based on a specific discrimination criterion. Examples of the discrimination criterion include a Fischer discrimination criterion and a least squares criterion. The spectrum-information generating section 604 projects the spectrum image Ssam of the object X to the discrimination space to set a position y.

$$y = f(Ssam)$$

Similarly, the spectrum-information generating section 604 projects the data r of the article determined as the non-defective product to the discrimination space to set y(r). The spectrum-information generating section 604 calculates the position y on the discrimination space of the object X and a distance m in the discrimination space from the article determined as the non-defective product.

$$m=g(y,y(r))$$

In the above expression, g(a, b) is a function for calculating a distance between "a" and "b" in the discrimination space. As the distance, for example, a Mahalanobis distance or a Euclidean distance can be used.

When the obtained distance m is smaller than a fixed threshold, the spectrum-information generating section 604 determines that the object X is a non-defective product. That is, the spectrum-information generating section 604 determines that the object X has a color equivalent to a color of the non-defective product or foreign matters do not adhere to the object X.

As explained above, in the step <6B>, when obtaining the spectrum image Ssam by superimposing the spectral images obtained at the wavelengths, the spectrum-information generating section 604 superimposes the spectral images subjected to the magnification conversion considering the magnitudes of the spectral images at the wavelengths. Accordingly, it is possible to accurately suppress or prevent positional deviation from occurring among the superimposed spectral images. Therefore, it is possible to obtain the spectrum image Ssam in which chromatic aberration of magnification is accurately suppressed or prevented from being included.

As explained above, with the z-axis direction set as the optical axis direction, the spectral imagers at the wavelengths are acquired by moving the spectroscopic camera in the z-axis direction. Accordingly, simply by superimposing the spectral images with the center of the optical axis along the z-axis direction set as the visual field center, it is possible to obtain the spectrum image Ssam in a state in which the positional deviation is surely suppressed or prevented from occurring among the spectral images at the wavelengths. That is, it is possible to easily carry out the superimposition of the spectral images at the wavelengths in the state in which positional deviation is accurately suppressed or prevented from occurring. Therefore, it is possible to easily acquire the spectrum image Ssam obtained by the superimposition. The spectrum image Ssam of the object X, that is, the produced article or the article being produced can be accurately obtained as spectrum information in this way. Accordingly, it is possible to inspect surface properties in the produced article or the article being produced with excellent accuracy in this step <7B>.

<8B> Subsequently, the display control section 13 creates, as a visualized image, a result obtained by inspecting the object X specified by the spectrum-information generating section 604 and thereafter causes the display device 61 to display the visualized image (S7B).

Examples of information concerning the object X displayed on the display device 61 as the visualized image include a detection result about whether the object X is a non-defective product or a defective product and, when the object X is the non-defective product, a probability (%) of the object X being the non-defective product, and, when the object X is the defective product, information such as a reason why the object is determined as the defective product and a position where foreign matters adhere.

The inspection of the object X is performed by carrying out the inspection processing through the step <1B> to the step <8B> using the robot system 100.

In the above explanation, the analysis processing for comparing the spectrum, which is the spectral information, and the database stored in the storing section 14 is carried out using the distance m in the discrimination space. However, not only this, but the analysis processing can also be carried out by machine learning such as a neural network.

In this embodiment, the shaft 241 is moved in the z-axis direction to relatively move the object X set on the workbench 8 and the spectroscopic camera 7 coupled to the shaft 241 in the optical axis direction of the spectroscopic camera 7. However, not only this, but the workbench 8 may be moved in the z-axis direction to relatively move the object X and the spectroscopic camera 7 in the optical axis direction of the spectroscopic camera 7.

In the inspection method using the robot system 100 explained above, the robot system 100 includes the spectroscopic camera 7. Accordingly, it is possible to carry out, for the produced article or the article being produced, an inspection of surfaces properties of the article with excellent accuracy. However, as explained above, there is a disadvantage that the spectroscopic camera 7 is expensive.

On the other hand, since the RGB camera is inexpensive, the RGB camera can be easily introduced into the inspection method. However, compared with the spectroscopic camera 7, the RGB camera is inferior in accuracy of an inspection. Therefore, in some case, surface properties of a high-precision article cannot be inspected by the RGB camera.

Accordingly, it is requested to determine, prior to introduction of a camera, according to a type of an article to be inspected by the inspection method, accuracy required for the inspection method, or the like, whether, as a type of the camera introduced into the robot system 100, the RGB camera is sufficient or the spectroscopic camera 7 needs to be selected.

There has been known an inspection system configured to, for the purpose of performing such determination, include an RGB camera that acquires an RGB image of an article, a spectroscopic camera that acquires a spectrum image of the article, and optical paths of two systems for acquiring these images and configured to be capable of imaging the object X, which is the same article, by switching the optical paths of the two systems.

The inspection system switches the optical paths of the two systems to acquire the RGB image and the spectrum image of the article. However, a mechanism for switching the optical paths of the two systems is necessary. Configurations of devices included in the inspection system are complicated.

On the other hand, in the present disclosure, the spectroscopic camera 7 included in the robot system 100 includes the spectroscopic section 41 configured by a variable wavelength interference filter that selectively transmits light having a predetermined wavelength, a receiving section configured to receive sensitivity information indicating a sensitivity curve in a wavelength region of a predetermined color imaged by the RGB camera, the spectrum-information generating section 604 including a wavelength-table generating section configured to generate, based on the sensitivity information, a wavelength table indicating a relation between a predetermined wavelength and a transmission time, which is a time in which transmitted light transmitted by the spectroscopic section is transmitted, the imaging element 71 functioning as the imaging section configured to acquire a spectral image formed by the transmitted light transmitted by the spectroscopic section 41, and the camera control section 60 functioning as a control section configured to control the spectroscopic section 41 and the imaging element 71 based on the wavelength table.

In the present disclosure, since the spectroscopic camera 7 has the configuration explained above, an RGB image assumed to be captured using the RGB camera can be generated by a simulation without preparing the RGB camera and using the spectroscopic camera 7 alone. That is, it is possible to simulatively capture the RGB image.

Accordingly, by selecting a defective-product of an article subjected to an inspection of surface properties as the object X imaged using the spectroscopic camera 7, an RGB image of the defective product, that is, a defective product RGB image can be generated by a simulation using the spectroscopic camera 7. Therefore, it is possible to determine, based on the defective product RGB image, whether the RGB camera is sufficient or whether the spectroscopic camera 7 needs to be selected, that is, determine a type of a camera to be selected.

Therefore, it is unnecessary to prepare the RGB camera in advance and it unnecessary to provide the optical paths of the two systems for switching the RGB camera and the spectroscopic camera 7. Therefore, it is possible to surely prevent the configuration of the robot system 100 from being complicated.

The RGB image can be directly generated, that is, captured by the simulation by imaging the object X using the spectroscopic camera 7. Therefore, it is possible to determine, during an early stage, a type of a camera to be selected when a defective product is imaged as the object X.

A spectroscopic inspection method for determining whether the RGB camera is sufficient or the spectroscopic camera 7 needs to be selected, the spectroscopic inspection method being carried out using the robot system 100, that is, the spectroscopic camera 7, is explained in detail below. A spectroscopic inspection method for determining, using the spectroscopic camera, a type of a camera to be used.

Figure 21:
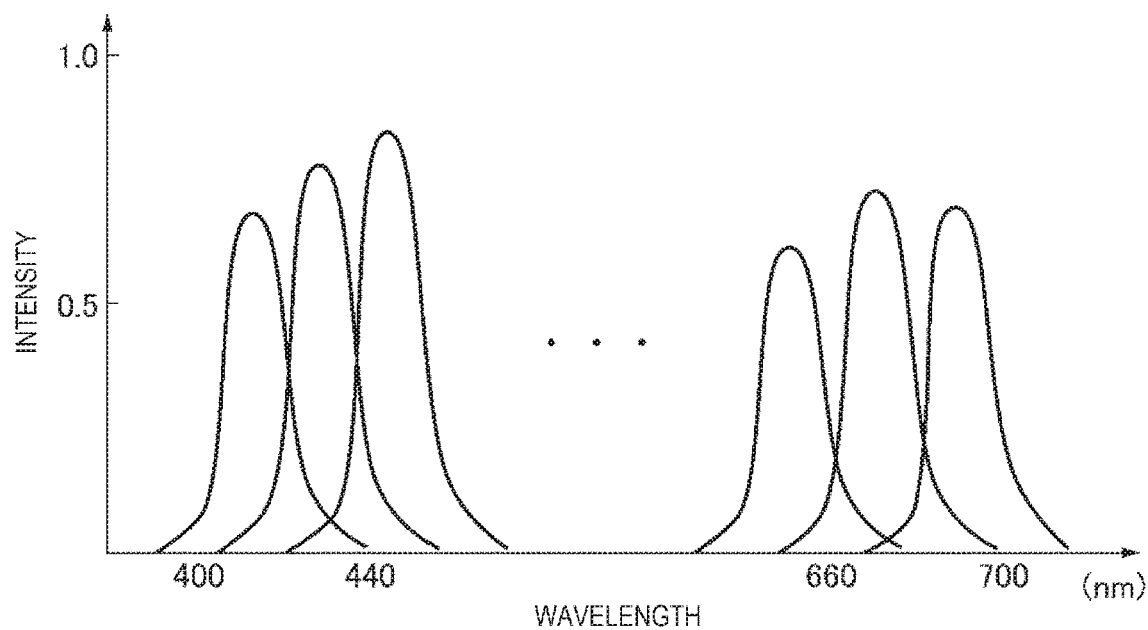
FIG. 21 is a graph showing a spectral sensitivity curve of the spectroscopic camera.
Figures 22, 23:
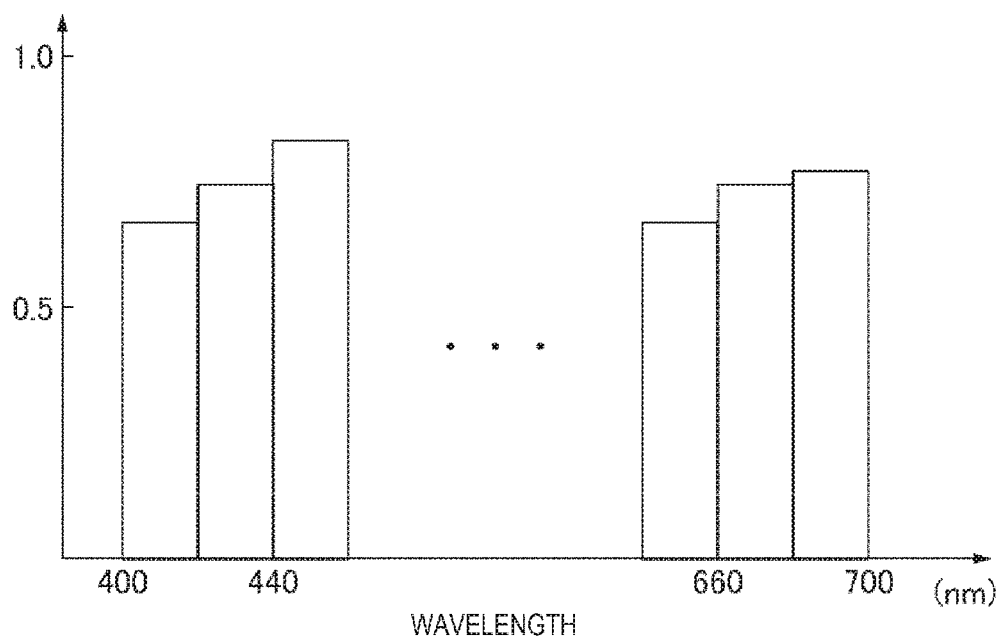
FIG. 22 is a bar graph obtained by averaging spectral sensitivity of the spectroscopic camera for each of wavelength regions having width of 20 nm.
FIG. 23 is a table showing a conversion coefficient for simulating an RGB image.
Figure 24:
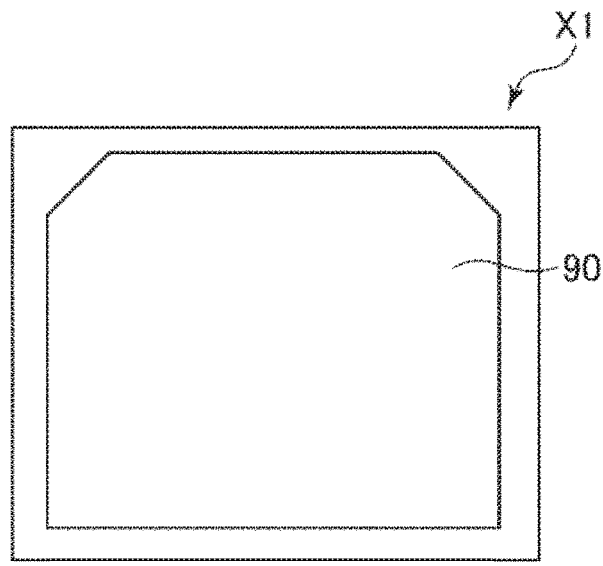
FIG. 24 is a plan view showing a non-defective product in which foreign matters do not adhere to an electrode included in an electronic component.
Figure 25:
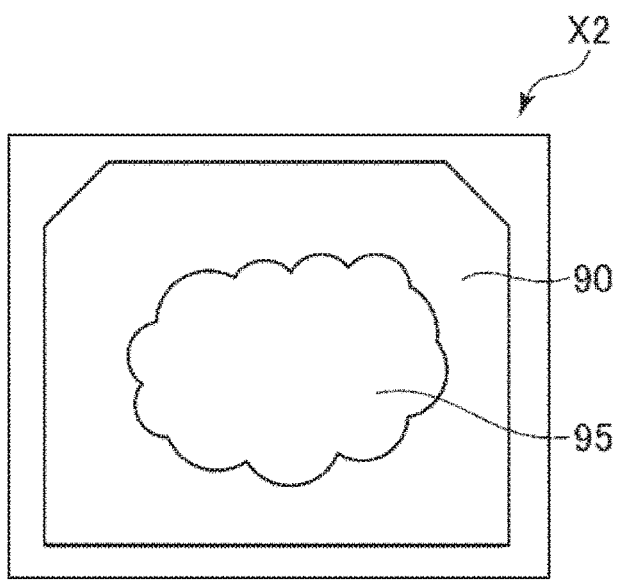
FIG. 25 is a plan view showing a defective product in which foreign matters adhere to an electrode included in an electronic component.
Figure 26:
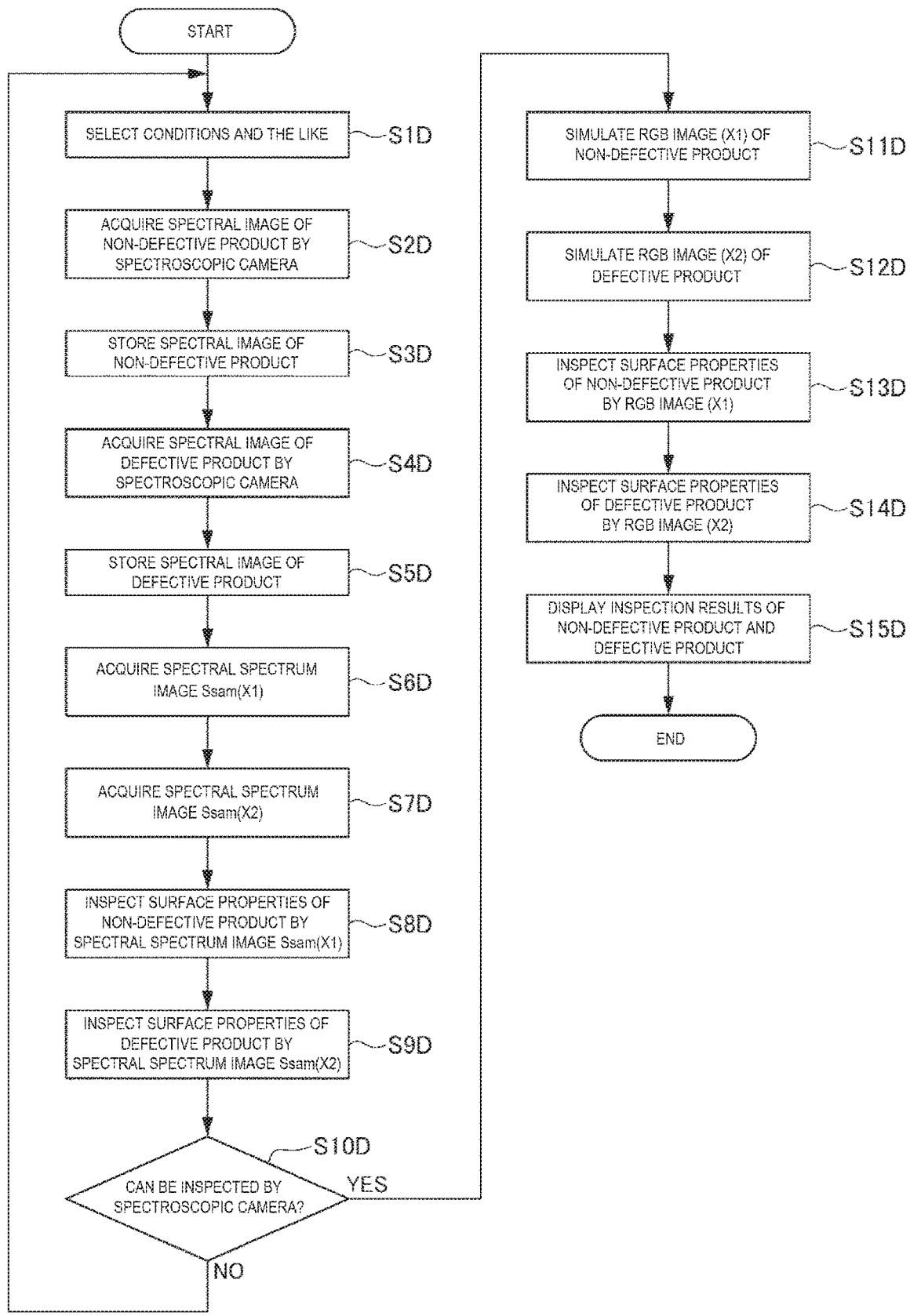
FIG. 26 is a flowchart at the time when determination processing in a spectroscopic inspection method for determining, using the spectroscopic camera, a type of a camera to be used is carried out by the robot system shown in FIG. 4.
Figure 27:
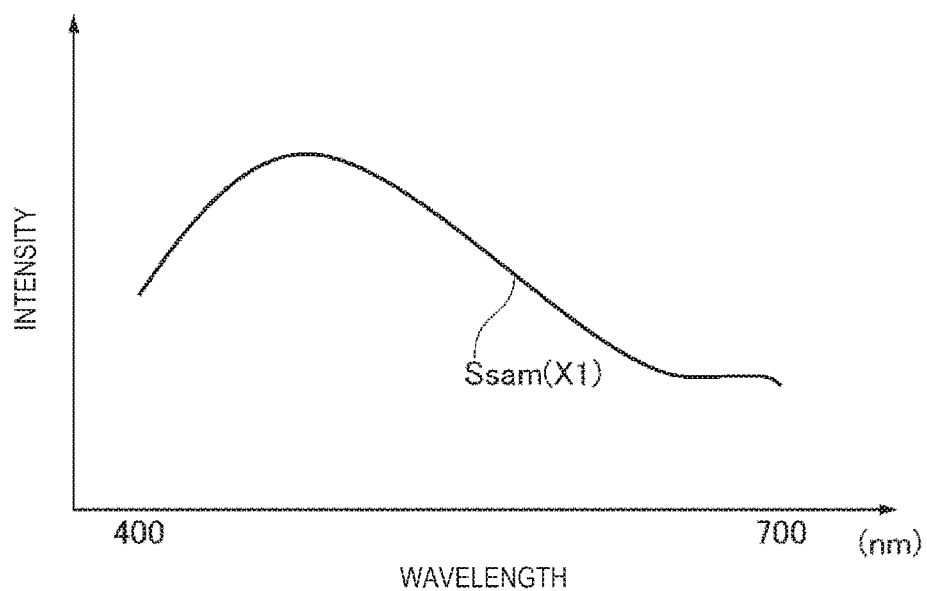
FIG. 27 is a graph showing a spectrum image Ssam(X1) of a non-defective product obtained by the spectroscopic camera.
Figure 28:
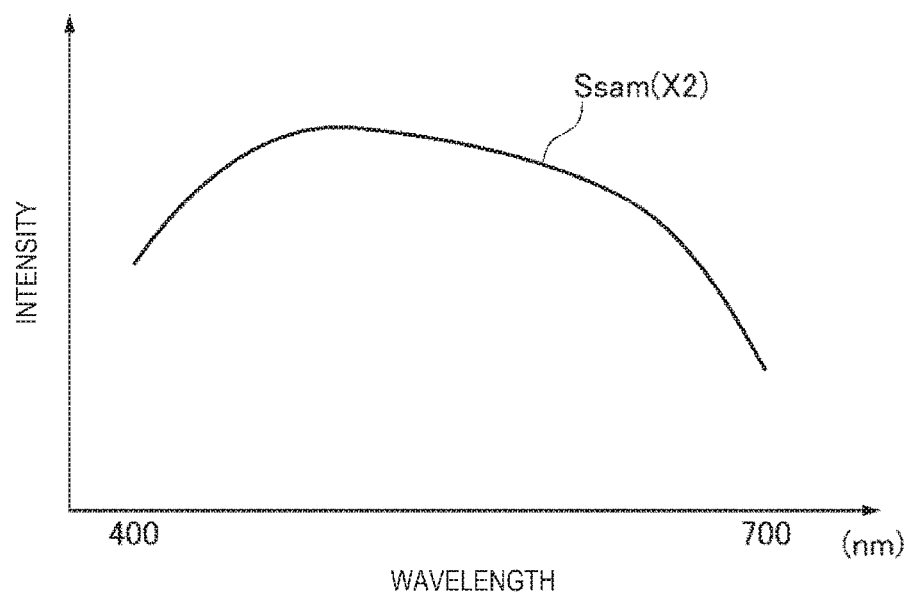
FIG. 28 is a graph showing a spectrum image Ssam(X2) of a defective product obtained by the spectroscopic camera.
Figure 29:
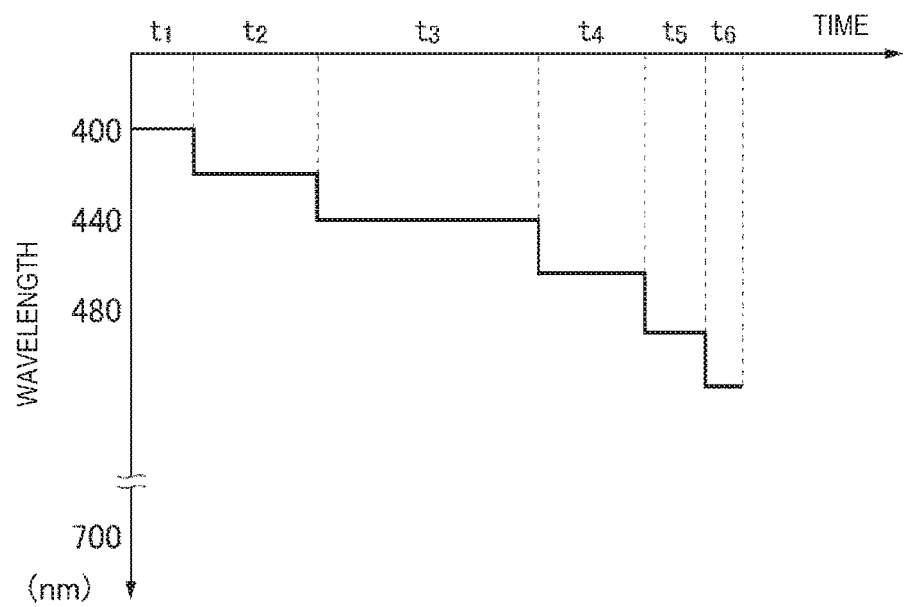
FIG. 29 is a graph showing time coefficients of a B component corresponding to the wavelengths.
Figure 30:
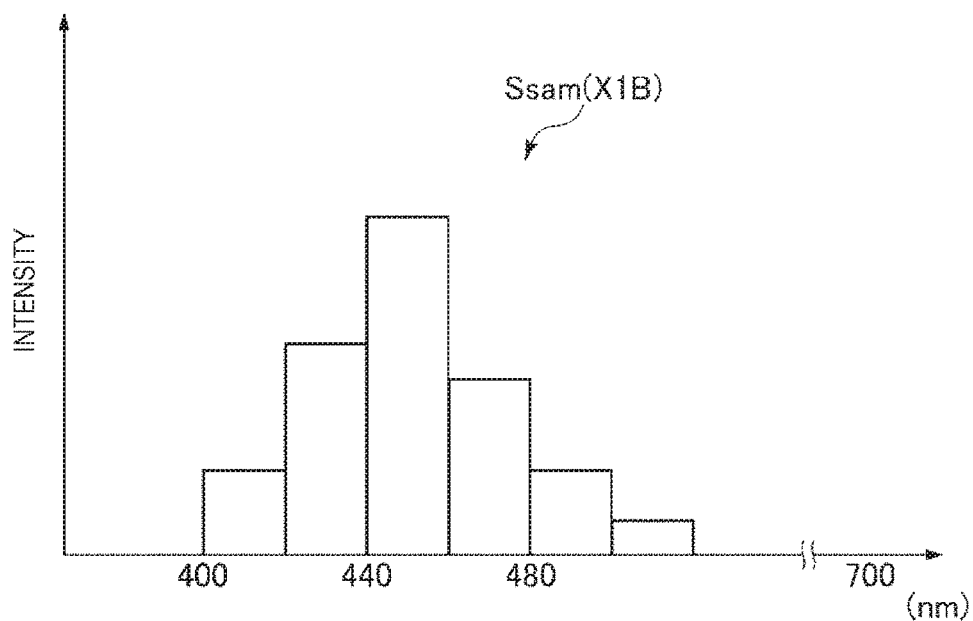
FIG. 30 is a graph showing a spectrum image Ssam(X1B) in the B component of the non-defective product simulated by the spectroscopic camera.
Figure 31:
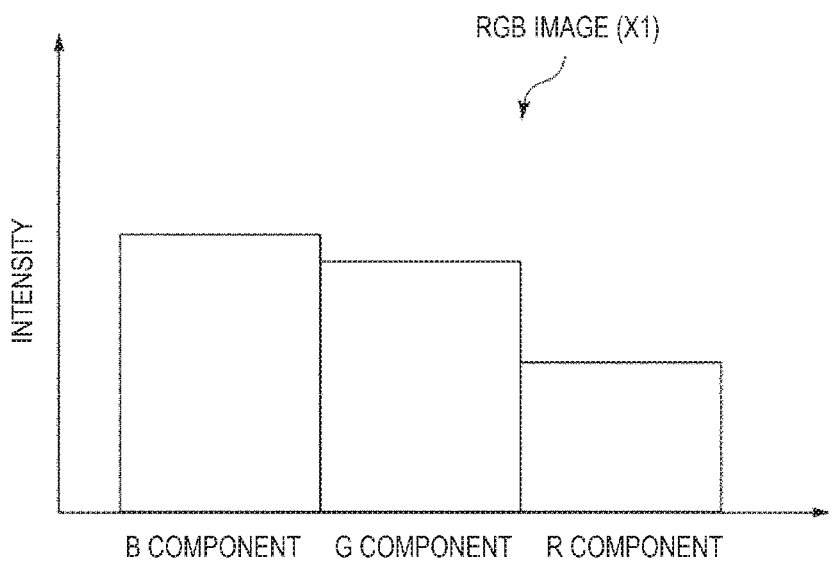
FIG. 31 is a graph showing a simulated RGB image (X1) of the non-defective product.
Figure 32:
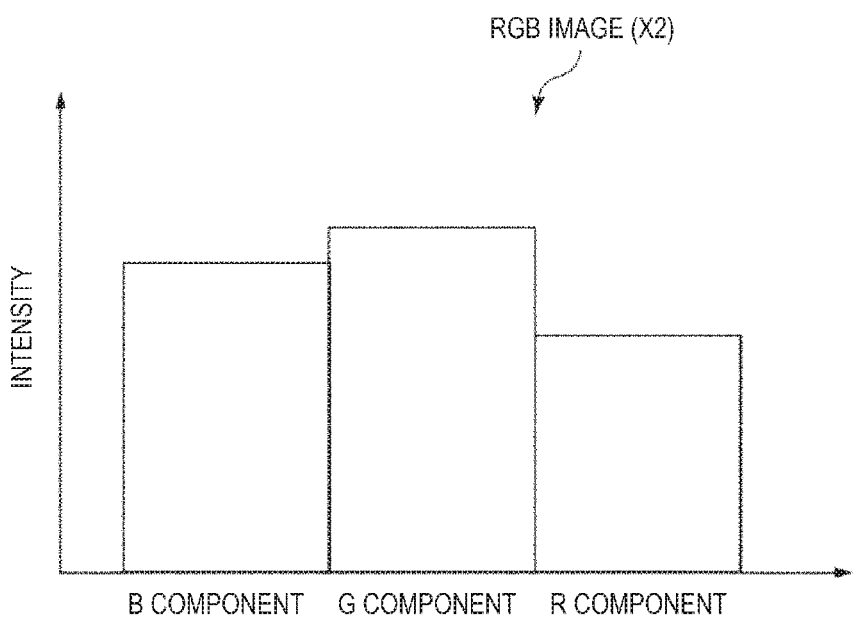
FIG. 32 is a graph showing a simulated RGB image (X2) of the defective product.

FIG. 20 is a graph showing a spectral sensitivity curve of the RGB camera. FIG. 21 is a graph showing a spectral sensitivity curve of the spectroscopic camera. FIG. 22 is a bar graph obtained by averaging spectral sensitivity of the spectroscopic camera for each wavelength region having width of 20 nm. FIG. 23 is a table showing a conversion coefficient for simulating an RGB image. FIG. 24 is a plan view showing a non-defective product in which foreign matters do not adhere to an electrode included in an electronic component. FIG. 25 is a plan view showing a defective product in which foreign matters adhere to the electrode included in the electronic component. FIG. 26 is a flowchart in carrying out, with the robot system shown in FIG. 4, determination processing in the spectroscopic inspection method for determining, using the spectroscopic camera, a type of a camera to be used. FIG. 27 is a graph showing a spectrum image Ssam(X1) of a non-defective product obtained by the spectroscopic camera. FIG. 28 is a graph showing a spectrum image Ssam(X2) of a defective product obtained by the spectroscopic camera. FIG. 29 is a graph showing time coefficients of a B component corresponding to wavelengths. FIG. 30 is a graph showing a spectrum image Ssam(X1B) in the B component of the non-defective product simulated by the spectroscopic camera. FIG. 31 is a graph showing a simulated RGB image (X1) of the non-defective product. FIG. 32 is a graph showing a simulated RGB image (X2) of the defective product.

In the spectroscopic inspection method for determining, using the robot system 100, that is, the spectroscopic camera 7, a type of a camera to be used, pre-conversion processing for calculating a conversion coefficient for simulating, with imaging by the spectroscopic camera 7, an RGB image assumed to be acquired using the RGB camera is carried out in advance based on a relation between a spectral sensitivity curve of the spectroscopic camera 7 and a spectral sensitivity curve of the RGB camera planned to be selected. Thereafter, determination processing for simulating, using the calculated conversion efficiency, with the imaging by the spectroscopic camera 7, the RGB image assumed to be acquired using the RGB camera to determine a type of a camera to be used, that is, whether the RGB camera is sufficient or the spectroscopic camera 7 is necessary is carried out.

Therefore, in the following explanation, the pre-conversion processing and the determination processing in the spectroscopic inspection method are explained in order.

Pre-Conversion Processing

First, the pre-conversion processing for calculating, based on a relation between a spectral sensitivity curve of the spectroscopic camera 7 and a spectral sensitivity curve of the RGB camera planned to be selected, a conversion coefficient for simulating an RGB image assumed to be acquired using the RGB camera by imaging by the spectroscopic camera 7 is explained. The pre-conversion processing is carried out in a state in which the personal computer 3 is attached to the control device 1 included in the robot system 100.

<1C> First, the user acquires the spectral sensitivity curve shown in FIG. 20 of the RGB camera planned to be selected and the spectral sensitivity curve shown in FIG. 21 of the spectroscopic camera 7.

<2C> Subsequently, for the spectral sensitivity curve of the spectroscopic camera 7 shown in FIG. 21, the user respectively calculates an average of intensity as shown in FIG. 22 in wavelength regions corresponding to spectral images captured by the spectroscopic camera 7.

In FIG. 22, a calculated average of intensity is shown as a bar graph for each of wavelength regions having width of 20 nm obtained by dividing a wavelength region of 400 to 700 nm into fifteen.

<3C> Subsequently, the user calculates, using averages of intensities in wavelength regions corresponding to spectral images shown in FIG. 22 and the spectral sensitivity curve of the RGB camera shown in FIG. 20, a conversion coefficient for simulating an RGB image indicating a relation between intensities of an R component, a G component, and a B component in the RGB camera and the averages of the intensities in the wavelength regions corresponding to the spectral images.

The conversion coefficient for simulating an RGB image can be obtained by dividing the intensities of the R component, the G component, and the B component in the RGB camera described in FIG. 20 by the calculated average of the intensity described in FIG. 22 according to each of the wavelength regions having the width of 20 nm obtained by dividing the visible light region of 400 nm to 700 nm into fifteen as shown in the table of FIG. 23.

In FIG. 22, the average of the intensity is calculated in the wavelength regions obtained by dividing the visible light region of 400 nm to 700 nm into fifteen by the width of 20 nm of the wavelength region. However, to obtain excellent detection sensitivity compared with the RGB camera that forms an image with three components of the R component, the G component, and the B component, the visible light region does not need to be divided into fifteen and only has to be divided into an integer equal to or larger than four.

<4C> Subsequently, after operating the input device 62 included in the control device 1 to thereby start a program for driving the image-processing editing section 302, the user causes the storing section 14 to store a conversion coefficient for simulating an RGB image shown in FIG. 23 to be executed by the image-processing executing section 65 according to an instruction of the program.

The conversion coefficient for simulating an RGB image configures sensitivity information indicating a sensitivity curve in a wavelength region of a predetermined color imaged by the RGB camera. The storing section 14 that stores the conversion coefficient for simulating an RGB image functions as a receiving section that receives the sensitivity information.

Through the pre-conversion processing explained above, that is, the step <1C> to the step <4C>, it is possible to calculate the conversion coefficient for simulating an RGB image in determination processing explained below.

That is, according to the steps <1C> to <4C>, it is possible to calculate a conversion coefficient used in generating a defective product RGB image by respectively acquiring intensities of an R component, a G component, and a B component with imaging by the spectroscopic camera 7 for determining that the object X as a defective product in a first generation process of the determination processing explained below.

2. Determination Processing

Determination processing in a spectroscopic inspection method for determining a type of a camera to be used using the spectroscopic camera 7 is explained. The determination processing is carried out in a state in which the personal computer 3 is detached from the control device 1 included in the robot system 100.

In the determination processing, in determination by the spectroscopic camera 7 concerning a type of a camera to be used, a non-defective product X1 or a defective product X2 of a produced article or an article being produced is set as the object X in Spectrum Match01 on the work bench 8 and the type of the camera to be used, that is, whether the RGB camera is sufficient or the spectroscopic camera 7 is necessary is determined according to whether the non-defective product X1 can be correctly classified, that is, evaluated as a non-defective product and the defective product X2 is correctly classified, that is, evaluated as a defective product. The determination processing is explained in detail below.

In the following explanation, as an example, an electronic component including an electrode 90 is prepared as an article set in Spectrum Match01 on the workbench 8. As shown in FIG. 24, an article in which foreign matters 95 do not adhere to the electrode 90 is treated as the non-defective product X1. As shown in FIG. 25, an article in which the foreign matters 95 adhere to the electrode 90 is treated as the defective product X2. When discriminating presence or absence of adhesion of the foreign matters 95, that is, discriminating the non-defective product X1 or the defective product X2, it is determined whether the RGB camera is sufficient as a camera to be selected or the spectroscopic camera 7 is necessary.

<1D> First, the user respectively prepares, as the electronic component including the electrode 90, pluralities of articles clearly determined as the non-defective product X1 or the defective product X2. At the same time, as shown in FIG. 26, after operating the input device 62 to start a program for inspecting surface properties of an article disposed in a predetermined region, the user selects conditions and the like when necessary according to an instruction of the program (S1D).

Examples of the conditions input according to the instruction of the program include designation for carrying out an inspection in a region where surface properties of the article are inspected, specifically, Spectrum Match01, designation of a type of the inspection for inspecting surface properties of the article, specifically, carrying out an inspection of presence or absence of the foreign matters 95 adhering to the article, and designation of positions where the spectroscopic camera 7 is disposed at an inspection start time and an inspection end time, a time of standby until acquisition of a spectral image of the article by the spectroscopic camera 7 after movement of the spectroscopic camera 7 by the robot 2, and acquisition of spectral images of fifteen regions in a wavelength region in acquiring a spectral image of the article with the spectroscopic camera 7 and at a pitch for changing a wavelength in the wavelength region, specifically, the pitch of 20 nm in a wavelength region of 400 to 700 nm.

In this embodiment, a spectral image is acquired using the spectroscopic camera 7 in the wavelength regions obtained by dividing the visible light region of 400 nm to 700 nm into fifteen by the width of the wavelength region of 20 nm. To obtain excellent detection sensitivity of the spectral image acquired by the spectroscopic camera 7 compared with the RGB camera that forms an image with the three components of the R component, the G component, and the B component, the visible light region does not need to be divided into fifteen and only has to be divided into an integer equal to or larger than four.

<2D> Subsequently, the electronic component including the electrode 90 recognized as the non-defective product X1 is set on the workbench 8 such that the electrode 90 corresponds to Spectrum Match01. Based on the relation between the wavelength of the light transmitted by the spectroscopic section 41, that is, the spectroscopic camera 7 and the in-focus position of the projection lens 812, that is, the spectroscopic camera 7 acquired in the adjustment processing in the inspection method for inspecting surface properties of the article, a spectral image of the non-defective product X1 is acquired by the imaging element 71, that is, the spectroscopic camera 7 at the set pitch of 20 nm in the wavelength region of 400 to 700 nm set in the step <1D> (S2D).

<2D-1> First, according to an input instruction by the user in the input device 62, the image-processing executing section 65 moves the shaft 241 in the z-axis direction, that is, the optical axis direction according to the operation of the camera-point correcting section 102 included in the robot control section 11 to dispose the spectroscopic camera 7 in the position P0. Thereafter, the image-processing executing section 65 moves the shaft 241 to the in-focus position of the spectroscopic camera 7 in a minimum wavelength region, that is, 400 to 420 nm in the wavelength region set in the step <1D>.

<2D-2> Subsequently, the image-processing executing section 65 sets, according to the operation of the spectroscopic control section 602 included in the camera control section 60, a wavelength region of the light transmitted by the spectroscopic section 41 to the minimum wavelength region, that is, 400 to 420 nm in the wavelength region set in the step <1D>.

<2D-3> Subsequently, the image-processing executing section 65 acquires a spectral image with the imaging element 71 according to the operation of the spectral-image acquiring section 603 included in the camera control section 60.

Consequently, the image-processing executing section 65 acquires a spectral image including the electrode included in the electronic component disposed in the region of Spectrum Match01 shown in FIG. 10.

<2D-4> Subsequently, the image-processing executing section 65 causes the storing section 14 to store the spectral image focused by the spectroscopic camera 7 acquired in the step <2D-3> and the fact that a wavelength region of light in which the spectral image is acquired is the minimum wavelength region, that is, 400 to 420 nm.

<3D> Subsequently, the image-processing executing section 65 determines, based on the conditions selected by the user in step <1D>, that is, the minimum wavelength region, the maximum wavelength region, and the pitch of the wavelength of the light transmitted by the spectroscopic section 41, whether it is necessary to acquire a spectral image with the spectroscopic camera 7 in an in-focus position of the spectroscopic camera 7 in light having a wavelength longer than the wavelength of the light in the minimum wavelength region after acquisition of a spectral image by the spectroscopic camera 7 in an in-focus position of the spectroscopic camera 7 in the light in the minimum wavelength region. That is, the image-processing executing section 65 determines that it is necessary to continuously carry out, from the light having the minimum wavelength to the light having the maximum wavelength at a pitch of a selected wavelength, the acquisition of the spectral image in the in-focus position of the spectroscopic camera 7 in the light having the wavelength and ends the acquisition of the spectral image in the light having the wavelength at a point in time when the light exceeds the maximum wavelength.

In the determination, when it is necessary to acquire a spectral image with the spectroscopic camera 7 in the in-focus position in light having a wavelength longer than the wavelength of the light in which the spectral image is acquired by the spectroscopic camera 7 in the in-focus position, the image-processing executing section 65 operates the spectroscopic control section 602 such that light having a wavelength added with a pitch set by the user, that is, 20 nm can be transmitted by the spectroscopic section 41. Thereafter, the image-processing executing section 65 repeatedly carries out the step <2D> to this step <3D>. Consequently, the acquisition of the spectral image by the spectroscopic camera 7 in the in-focus position in the light having the wavelength longer than the wavelength of the light in the wavelength region in which the spectral image is acquired by the spectroscopic camera 7 in the in-focus position is carried out. The image-processing executing section 65 repeatedly carries out, fifteen times, the acquisition of the spectral image by the spectroscopic camera 7 in the in-focus position in the light in such a minimum or larger wavelength region from the minimum wavelength to the maximum wavelength at the fixed pitch in the wavelength region selected by the user in the step <1D>, that is, in this embodiment, from 400 nm to 700 nm at the pitch of 20 nm.

In this way, the minimum wavelength for acquiring the spectral image, the maximum wavelength for acquiring the spectral image, and the pitch of the wavelength for acquiring the spectral image between the minimum wavelength and the maximum wavelength are set. The acquisition of the spectral image by the spectroscopic camera 7 in the in-focus position is sequentially carried out from the minimum wavelength to the maximum wavelength at an interval of the pitch.

As explained above, by repeatedly carrying out the step <2D> to this step <3D>, it is possible to acquire, as focused spectral images, spectral images obtained by imaging the non-defective product X1 in the light in the minimum wavelength region to the light in the maximum wavelength region at the fixed pitch in the wavelength region selected by the user in the step <1D>.

That is, it is possible to acquire, as focused spectral images, spectral images obtained by imaging the non-defective product X1 at the time when the wavelength region of the light transmitted by the spectroscopic section changes from the minimum wavelength of 400 nm to the maximum wavelength of 700 at the pitch of 20 nm.

On the other hand, when the light is in a wavelength region exceeding the maximum wavelength and it is unnecessary to acquire a spectral image in an in-focus position in the light in the wavelength region, the image-processing executing section 65 ends the repetition of the step <2D> to this step <3D> and shifts to the next step <4D>.

<4D> Subsequently, the image-processing executing section 65 causes the storing section 14 to store, once again, as spectral image data of the non-defective product X1, the spectral images focused by the spectroscopic camera repeatedly acquired until the wavelength of the light transmitted by the spectroscopic section 41 changes from the minimum wavelength region to the maximum wavelength region at the fixed pitch in the wavelength region selected by the user in the step <1D> and the wavelength regions of the light in which the spectral images are acquired (S3D).

That is, in this embodiment, the image-processing executing section 65 causes the storing section 14 to store, together with spectral images focused by the spectroscopic camera 7 from the minimum wavelength region of 400 to 420 nm to the maximum wavelength region of 680 to 700 nm at the pitch of 20 nm, wavelength regions of the light corresponding to the spectral images.

As explained above, through the step <2D> to the step <4D>, spectral images of the non-defective product X1 focused by the spectroscopic camera 7 from the minimum wavelength region to the maximum wavelength region at the fixed pitch in the wavelength region selected by the user are acquired.

The acquisition of the spectral images of the non-defective product X1 through the step <2D> to the step <4D> is carried out for a plurality of non-defective products X1.

The acquisition of the spectral images of the non-defective product X1 in the wavelength regions by the spectroscopic camera 7 in the step <2D> to this step <4D> configures a second acquiring step for imaging the non-defective product X1 in different n (in this embodiment, n is fifteen) wavelength regions using the spectroscopic camera 7 and acquiring a plurality-wavelengths non-defective product image.

<5D> Subsequently, the user sets, instead of the non-defective product X1, an article recognized as the defective product X2, which is the electronic component including the electrode 90, on the workbench 8 such that the electrode 90 corresponds to Spectrum Match01. In this state, the image-processing executing section 65 carries out the step <4D> after repeating the step <2D> to the step <3D>. Consequently, like the spectral images of the non-defective product X1, as spectral images focused by the spectroscopic camera 7, spectral images of the defective product X2 are acquired as a plurality-wavelengths defective image until the wavelength of the light transmitted by the spectroscopic section 41 changes from the minimum wavelength region to the maximum wavelength region at the fixed pitch in the wavelength region selected by the user in the step <1D> (S4D). Information concerning the spectral images are stored in the storing section 14 for the defective product X2 in the same manner as for the non-defective product X1 (S5D).

The acquisition of the spectral images of the defective product X2 through this step <5D> is carried out for a plurality of defective products X2.

The acquisition of the spectral images of the defective product X2 in the wavelength regions by the spectroscopic camera 7 in this step <5D> configures a first acquiring step for imaging the defective product X2 in different n (in this embodiment, n is fifteen) wavelength regions using the spectroscopic camera 7 and acquiring a plural-wavelengths defective image.

<6D> Subsequently, the spectrum-information generating section 604 included in the image-processing executing section 65 superimposes, that is, weighted-superimposes the spectral images in the wavelength regions acquired for the non-defective product X1 to obtain a spectrum image Ssam (X1) shown in FIG. 27 (S6D).

The acquisition of the spectrum image Ssam(X1) of the non-defective product X1 through this step <6D> is carried out for a plurality of non-defective products X1.

<7D> Subsequently, the spectrum-information generating section 604 included in the image-processing executing section 65 superimposes, that is, weighted-superimposes the spectral images in the wavelength regions acquired for the defective product X2 to obtain a spectrum image Ssam(X2) shown in FIG. 28 (S7D).

The acquisition of the spectrum image Ssam(X2) of the defective product X2 through this step <7D> is carried out for a plurality of defective products X2.

<8D> Subsequently, the spectrum-information generating section 604 inspects surface properties of the non-defective product X1, which is the object X, based on the spectrum image Ssam(X1) obtained for the non-defective product X1, that is, spectrum information of the non-defective product X1 (S8D).

In other words, the spectrum-information generating section 604 selects the spectrum image Ssam(X1) obtained in the step <6D>. Thereafter, the spectrum-information generating section 604 carries out analysis processing using, as a feature value, the spectrum image Ssam(X1) serving as spectral information to inspect surface properties of the non-defective product X1 to be inspected.

Specifically, first, the spectrum-information generating section 604 projects the spectrum image Ssam(X1) serving as the feature value to a discrimination space suitable for discriminating surface properties of the non-defective product X1. That is, the spectrum-information generating section 604 generates the projection function f(•) based on a specific discrimination criterion. Examples of the discrimination criterion include a Fischer discrimination criterion and a least squares criterion. The spectrum-information generating section 604 projects the spectrum image Ssam(X1) of the non-defective product X1 to the discrimination space to set a position y(a).

$$y(a)=f(Ssam(X1))$$

Similarly, the spectrum-information generating section 604 projects the spectrum image Ssam(X1) of another non-defective product X1 to the discrimination space to set y(b). The spectrum-information generating section 604 calculates a distance m1 between the position y(a) on the discrimination space of the non-defective product X1 and the position y(b) on the discrimination space of the second non-defective product X1. The spectrum-information generating section 604 calculates the distance m1 for combinations of a plurality of non-defective products X1.

$$m1=g(y(a),y(b))$$

In the above expression, g(a, b) is a function for calculating a distance between "a" and "b" in the discrimination space. As the distance, for example, a Mahalanobis distance or a Euclidean distance can be used.

The distance m1 included about the plurality of non-defective products X1 can be defined as a distance that can be considered the non-defective product X1.

Accordingly, a region closer than the distance m1 can be considered a region indicating a non-defective product distribution calculated by a third inspection result, which is a result of a predetermined inspection for the non-defective product X1 performed by using the spectrum image Ssam (X1) of the non-defective product X1, that is, the plural-wavelengths non-defective product image.

<9D> Subsequently, the spectrum-information generating section 604 inspects surface properties of the defective product X2, which is the object X, based on the spectrum image Ssam(X2) obtained for the defective product X2, that is, the spectrum information of the defective product X2 (S9D).

In other words, the spectrum-information generating section 604 selects the spectrum image Ssam(X2) obtained in the step <7D>. Thereafter, the spectrum-information generating section 604 carries out analysis processing using, as a feature value, the spectrum image Ssam(X2) serving as spectral information to inspect surface properties of the defective product X2 to be inspected.

Specifically, first, the spectrum-information generating section 604 projects, as a feature value, the spectrum image Ssam(X1) of the non-defective product X1 to the discrimination space suitable for discriminating surface properties of the non-defective product X1 used in the step <8D>. That is, the spectrum-information generating section 604 generates the projection function f(•) based on a specific discrimination criterion. Examples of the discrimination criterion include a Fischer discrimination criterion and a least squares criterion. The spectrum-information generating section 604 projects the spectrum image Ssam(X1) of the non-defective product X1 to the discrimination space to set a position y(a).

$$y(a)=f(Ssam(X1))$$

Similarly, the spectrum-information generating section 604 projects the spectrum image Ssam(X2) of the defective product X2 to the discrimination space to set y(c).

$$y(c)=f(Ssam(X2))$$

The spectrum-information generating section 604 calculates a distance m2 between the position y(a) on the discrimination space of the non-defective product X1 and the position y(c) on the discrimination space of the defective product X2. The spectrum-information generating section 604 calculates the distance m2 for combinations of a plurality of non-defective products X1 and a plurality of defective products X2.

$$m2=g(y(a),y(c))$$

In the above expression, g(a, b) is a function for calculating a distance between "a" and "b" in the discrimination space. As the distance, for example, a Mahalanobis distance or a Euclidean distance can be used.

When the distance m1<the distance m2 holds at a fixed probability or more (preferably, 100%) for the combinations of the plurality of non-defective products X1 and the plurality of defective products X2, it can be considered that discrimination of the non-defective product X1 and the defective product X2 can be carried out by the spectroscopic camera 7 with which the spectrum image Ssam(X1) of the non-defective product X1 and the spectrum image Ssam(X2) of the defective product X2 are acquired.

When the distance m1<the distance m2 does not hold at the fixed probability or more and it is determined that discrimination of the non-defective product X1 and the defective product X2 by the spectroscopic camera 7 cannot be carried out, the spectrum-information generating section 604 displays to that effect on the display device 61 according to the operation of the display control section 13. In response to the display, the user changes the conditions such as the disposition position of the spectroscopic camera 7, the wavelength region acquired by the spectroscopic camera 7, and the width of the pitch and carries out the step <1D> to the step <9D> again (S10D). In this way, the user finds conditions under which the discrimination of the non-defective product X1 and the defective product X2 can be carried out.

<10D> Subsequently, when spectral images of the non-defective product X1 are acquired by the imaging element 71, that is, the spectroscopic camera 7 at the wavelength having the set width of the pitch of 20 nm in the wavelength region of 400 to 700 nm set in the step <1D>, the spectrum-information generating section 604 sets, as appropriate, based on the conversion coefficient for simulating an RGB image acquired by the pre-conversion processing, for each of wavelengths, a time in which the spectral images are acquired by the spectroscopic camera 7 to simulate an RGB image (X1) of the non-defective product X1 shown in FIG. 31 assumed to be acquired using an RGB camera planned to be introduced (S11D).

<10D-1> First, the spectrum-information generating section 604 included in the image-processing executing section 65 acquires, from the storing section 14, the conversion coefficients for simulating an RGB image shown in FIG. 23 acquired in the pre-conversion processing and converts, for components of an R component, a G component, and a B component, according to the magnitudes of the conversion coefficients corresponding to the wavelengths, the conversion coefficients into time coefficients corresponding to the lengths of times for acquiring spectral images corresponding to the wavelengths. That is, the spectrum-information generating section 604 sets magnitudes of the time coefficients such that a proportional relation of the time coefficients with the conversion coefficients holds. Thereafter, the spectrum-information generating section 604 prepares time coefficients for the B component corresponding to the wavelengths shown in FIG. 29 among the time coefficients of the components such that the time coefficients for the B component can be used in a later step <10D-3>.

In this step <10D-1>, the conversion coefficients for simulating an RGB image are acquired from the storing section 14, which is a receiving section, as sensitivity information indicating sensitivity curves in wavelength regions of predetermined colors imaged by the RGB camera. A wavelength table serving as information indicating a relation between a wavelength of transmitted light transmitted by the spectroscopic section 41 and a time in which the transmitted light is transmitted by the spectroscopic section 41 is generated as the time coefficients based on the sensitivity information. Further, the spectrum-information generating section 604 functions as a wavelength-table generating section for generating the wavelength table, that is, the time coefficients.

<10D-2> Subsequently, according to an input instruction by the user in the input device 62, the image-processing executing section 65 moves the shaft 241 in the z-axis direction, that is, the optical axis direction according to the operation of the camera-point correcting section 102 included in the robot control section 11 to dispose the spectroscopic camera 7 in the position P0. Thereafter, the image-processing executing section 65 moves the shaft 241 to an in-focus position of the spectroscopic camera 7 in the minimum wavelength region, that is, 400 to 420 nm in the wavelength region set in the step <1D>.

<10D-3> Subsequently, the image-processing executing section 65 sets, according to the operation of the spectroscopic control section 602 included in the camera control section 60, the wavelength region of the light transmitted by the spectroscopic section 41 to the minimum wavelength region, that is, 400 to 420 nm in the wavelength region set in the step <1D>.

<10D-4> Subsequently, the image-processing executing section 65 acquires a spectral image with the imaging element 71 according to the operation of the spectral-image acquiring section 603 included in the camera control section 60.

In the acquisition of the spectral image, the image-processing executing section 65 sets the time in which the spectral image is acquired by the imaging element 71 to the length of the time coefficient of the B component at 400 nm corresponding to the minimum wavelength region, that is, 400 to 420 nm among the time coefficients of the B component prepared in the step <10D-1>.

Consequently, a spectral image including the electrode 90 included in the non-defective product X1, which is the electronic component, disposed in the region of Spectrum Match01 shown in FIG. 10 is acquired as a spectral image corresponding to the minimum wavelength region. The intensity in the spectral image is set according to the time coefficient corresponding to the minimum wavelength region among the time coefficients of the B component.

The operation of the spectroscopic control section 602 included in the camera control section 60 functioning as the control section is controlled in the step <10D-3> based on the wavelength table, that is, the time coefficient, whereby the wavelength region of the light transmitted by the spectroscopic section 41 is set to the minimum wavelength region. Further, the operation of the spectral-image acquiring section 603 included in the camera control section 60 functioning as the control section is controlled in this step <10D-4>, whereby the length of the time acquired by the imaging element 71, that is, the length of the time in which the light is transmitted by the spectroscopic section 41 is set to length based on the time coefficient.

Therefore, a time in which the light, that is, the transmitted light is transmitted by the spectroscopic section 41 (a transmission time) can be considered as being set based on intensity indicating sensitivity to fixed optical energy in each of wavelength regions obtained by dividing a wavelength region from a minimum wavelength to a maximum wavelength into fifteen in the B component of the sensitivity curve serving as the sensitivity information.

The length of the time in which the spectral image of the non-defective product X1 is acquired by the imaging element 71, that is, the length of the time in which the light is transmitted by the spectroscopic section 41 is set to length at the time when the wavelength region of the light transmitted by the spectroscopic section 41 is the minimum wavelength region.

The time in which the spectral image is acquired by the imaging element 71 is measured by a timer included in the control device 1. The image-processing executing section 65 operates the spectral-image acquiring section 603 according to the time measured by the timer to control the length of the time in which the spectral image is acquired.

<10D-5> Subsequently, the image-processing executing section 65 causes the storing section 14 to store the spectral image focused by the spectroscopic camera 7 acquired in the step <10D-3> and the fact that the wavelength region of the light in which the spectral image is acquired is the minimum wavelength region, that is, 400 to 420 nm and the spectral image is acquired according to the minimum wavelength region among the time coefficients of the B component.

<10D-6> Subsequently, the image-processing executing section 65 determines, based on the conditions selected by the user in the step <1D>, that is, the minimum wavelength region, the maximum wavelength region, and the pitch of the wavelength of the light transmitted by the spectroscopic section 41, whether acquisition of a spectral image by the spectroscopic camera 7 in the in-focus position of the spectroscopic camera 7 in light having a wavelength longer than the wavelength of the light in the minimum wavelength region is necessary after the acquisition of the spectral image by the spectroscopic camera 7 in the in-focus position of the spectroscopic camera 7 in the light in the minimum wavelength region. That is, the image-processing executing section 65 determines that it is necessary to continuously carry out, from the light in the minimum wavelength region to the light in the maximum wavelength region at a selected pitch of the wavelength region, acquisition of a spectral image in the in-focus position of the spectroscopic camera 7 in the light in the wavelength region. The image-processing executing section 65 ends the acquisition of the spectral image in the light in the wavelength region at a point in time when the light exceeds the maximum wavelength region.

In the determination, when it is necessary to acquire a spectral image with the spectroscopic camera 7 in the in-focus position in the light having the wavelength longer than the wavelength of the light in the wavelength region in which the acquisition of the spectral image by the spectroscopic camera 7 in the in-focus position is performed, the image-processing executing section 65 repeatedly carries out the step <10D-2> to this step <10D-5>.

At this time, in the step <10D-2>, the camera-point correcting section 102 moves the spectroscopic camera 7 to the in-focus position of the spectroscopic camera 7 in light in a wavelength region added with a pitch set by the user, that is, 20 nm. In the step <10D-3>, the image-processing executing section 65 operates the spectroscopic control section 602 such that the light in the wavelength region added with the pitch set by the user can be transmitted by the spectroscopic section 41. Further, in the step <10D-4>, the image-processing executing section 65 sets the time in which the spectral image is acquired by the imaging element 71 to the length of a time coefficient of the B component corresponding to the light in the wavelength region added with the pitch set by the user, that is, 20 nm among the time coefficients of the B component prepared in the step <10D-1>. Consequently, the acquisition of the spectral image by the spectroscopic camera 7 in the in-focus position in the light having the wavelength longer than the wavelength of the light in the wavelength region in which the acquisition of the spectral image by the spectroscopic camera 7 in the in-focus position is performed is carried out at intensity considering the length of the time coefficient of the B component. In this way, the acquisition of the spectral image by the spectroscopic camera 7 in the in-focus position in the light in the minimum or larger wavelength region is performed at the intensity considering the length of the time coefficient of the B component. The acquisition of the spectral image at the intensity considering the length of the time coefficient of the B component is repeatedly carried out from the minimum wavelength region to the maximum wavelength region at the fixed pitch in the wavelength region selected by the user in the step <1D>. That is, in this embodiment, the acquisition of the spectral image is repeatedly carried out fifteen times from 400 nm to 700 nm at the pitch of 20 nm. Concerning a wavelength, a conversion coefficient of which corresponding to the B component among the conversion coefficients shown in FIG. 23 is 0, acquisition of a spectral image in a wavelength region corresponding to the wavelength is omitted.

In this way, the minimum wavelength region for acquiring the spectral image, the maximum wavelength region for acquiring the spectral image, and the pitch of the wavelength for acquiring the spectral image between the minimum wavelength region and the maximum wavelength region are set. The acquisition of spectral images by the spectroscopic camera 7 in the in-focus position is sequentially carried out from the minimum wavelength region to the maximum wavelength region at the interval of the pitch. These spectral images are acquired as the spectrum image Ssam(X1B) in the B component of the non-defective product X1 having intensity considering the length of the time coefficient of the B component (see FIG. 30).

By repeatedly carrying out the step <10D-2> to this step <10D-5> as explained above, it is possible to acquire, as focused spectral images, spectral images in the B component obtained by imaging the non-defective product X1 in the light in the minimum wavelength region to the light in the maximum wavelength region at the fixed pitch in the wavelength region selected by the user in the step <1D>.

That is, spectral images in the B component obtained by imaging the non-defective product X1 when the wavelength region of the light transmitted by the spectroscopic section 41 is changed from the minimum wavelength of 400 nm to the maximum wavelength of 700 nm at the pitch of 20 nm can be acquired as the focused spectral images.

Further, since the spectral images in the B component are acquired as spectral images having intensity considering the length of the time coefficient of the B component, it is possible to directly obtain, according to the acquisition of a plurality of spectral images in the B component in the wavelength regions, the spectrum image Ssam(X1B) in the B component of the non-defective product X1 assumed to be acquired using the RGB camera. Accordingly, it is possible to carry out shift to the next step <10D-5> and subsequent steps in an early stage.

On the other hand, when the light changes to light in a wavelength region exceeding the maximum wavelength and it is unnecessary to acquire a spectral image in an in-focus position in the light in the wavelength region, the image-processing executing section 65 ends the repetition of the step <10D-2> to this step <10D-5> and shifts to the next step <10D-7>.

<10D-7> Subsequently, the image-processing executing section 65 causes the storing section 14 to store, once again, as the spectral image data of the non-defective product X1, that is, the spectrum image Ssam(X1B) in the B component of the non-defective product X1, spectral images focused by the spectroscopic camera 7 and having intensity considering the length of the time coefficient of the B component, which are repeatedly acquired until the wavelength of the light transmitted by the spectroscopic section 41 changes from the minimum wavelength region to the maximum wavelength region at the fixed pitch in the wavelength region selected by the user in the step <1D>, and the wavelength regions of the light in which the spectral images are acquired.

<10D-8> Subsequently, the image-processing executing section 65 reads intensities in the wavelength regions in the spectrum image Ssam(X1B) in the B component of the non-defective product X1 and thereafter calculates an average of the intensities.

Consequently, it is possible to obtain the intensity of the B component in the RGB image (X1) of the non-defective product X1.

The image-processing executing section 65 causes the storing section 14 to store the intensity of the B component.

As explained above, the intensity of the B component in the RGB image (X1) of the non-defective product X1 is acquired through the step <10D-1> to the step <10D-8>.

<10D-9> Subsequently, the image-processing executing section 65 prepares time coefficients of the G component corresponding to the wavelengths instead of the time coefficients of the B component corresponding to the wavelengths and carries out the step <10D-2> to the step <10D-8> using the time coefficients of the G component corresponding to the wavelengths to acquire the intensity of the G component in the RGB image (X1) of the non-defective product X1.

<10D-10> Subsequently, the image-processing executing section 65 prepares time coefficients of the R component corresponding to the wavelengths instead of the time coefficients of the B component corresponding to the wavelengths and carries out the step <10D-2> to the step <10D-8> using the time coefficients of the R component corresponding to the wavelengths to acquire the intensity of the R component in the RGB image (X1) of the non-defective product X1.

It is possible to simulate the RGB image (X1) of the non-defective product X1 shown in FIG. 31 through the step <10D-1> to the step <10D-10> as explained above.

The simulation of the RGB image of the non-defective product X1 by this step <10D> is carried out for a plurality of non-defective products X1.

As explained above, the spectrum-information generating section 604 functions as an RGB-image generating section that, when a non-defective product spectral image is acquired by imaging the non-defective product X1 using the spectroscopic camera 7 in this step <10D>, generates a non-defective product RGB image based on the non-defective product spectral image.

<11D> Subsequently, when acquiring spectral images of the defective product X2 with the imaging element 71, that is, the spectroscopic camera 7 at a wavelength having the set width of the pitch of 20 nm in the wavelength region of 400 to 700 nm set in the step <1D>, the spectrum-information generating section 604 sets, for each of the wavelengths, as appropriate, based on the conversion coefficient for simulating the RGB image acquired into the pre-conversion processing, a time in which the spectral images are acquired by the spectroscopic camera 7 to simulate the RGB image (X2) of the defective product X2 shown in FIG. 32 assumed to be acquired using the RGB camera planned to be introduced (S12D).

The simulation of the RGB image (X2) of the defective product X2 can be carried out through the step <10D-1> to the step <10D-10> after the electrode 90 included in the defective product X2 is disposed in the region of Spectrum Match01 instead of disposing the electrode 90 included in the non-defective product X1, which is the electronic component, in the region of the Spectrum Match01 shown in FIG. 10.

The simulation of the RGB image of the defective product X2 by this step <11D> is carried out for a plurality of defective products X2.

As explained above, the spectrum-information generating section 604 functions as an RGB-image generating section that, when the defective-product spectral image is acquired by imaging the defective product X2 using the spectroscopic camera 7 in this step <11D>, generates a defective-product RGB image based on the defective-product spectral image.

<12D> Subsequently, the spectrum-information generating section 604 carries out, based on the RGB image (X1) simulated for the non-defective product X1, an inspection of surface properties with the non-defective product X1 set as the object X and assuming use of the RGB camera (S13D).

In other words, the spectrum-information generating section 604 acquires the RGB image (X1) obtained in the step <10D>. Thereafter, the spectrum-information generating section 604 carries out analysis processing using the RGB image (X1) as a feature value to carry out the inspection of surface properties with the non-defective product X1 set as the object X and assuming use of the RGB camera.

Specifically, first, the spectrum-information generating section 604 projects the RGB image (X1) serving as the feature value to a discrimination space suitable for discriminating surface properties of the non-defective product X1. That is, the spectrum-information generating section 604 generates the projection function f(•) based on a specific discrimination criterion. As the discrimination criterion, the same criterion as the criterion explained in the step <8D> is selected. The spectrum-information generating section 604 projects the RGB image (X1) of the non-defective product X1 to the discrimination space and set a position y(a').

$$y(a')=f(\text{RGB image}(X1))$$

Similarly, the spectrum-information generating section 604 projects the RGB image (X1) of another non-defective product X1 to the discrimination space and sets y(b'). The spectrum-information generating section 604 calculates a distance m1' between the position y(a') on the discrimination space of the non-defective product X1 and the position y(b') on the discrimination space of the second non-defective product X1. The spectrum-information generating section 604 calculates the distance m1' for combinations of a plurality of non-defective products X1.

$$m1'=g(y(a'),y(b'))$$

As in the step <8D>, g(a, b) is a function for calculating a distance between "a" and "b" in the discrimination space. As the distance, for example, Mahalanobis distance or a Euclidean distance can be used.

When the distance m1≥the distance m1' holds at a fixed probability or more (preferably, 100%), that is, a threshold or more for the distance m1' calculated for the plurality of non-defective products X1, it is considered that the non-defective product X1 is correctly determined as a non-defective product by the determination of the non-defective product X1 by the RGB image (X1) as well. That is, it can be considered that, for the determination of the non-defective product X1, the spectroscopic camera 7 is unnecessary and the RGB camera is sufficient.

In other words, when it is determined by the inspection based on the RGB image (X1) of the non-defective product X1 that the non-defective product X1 is a non-defective product, it can be determined that the RGB camera inspection using the RGB camera satisfies a predetermined criterion, that is, has reliability equal to or higher than the threshold.

To the contrary, when the distance m1<the distance m1' holds at the fixed probability or more (preferably, 100%), that is, the threshold or more for the distance m1' calculated for the plurality of non-defective products X1, it is considered that the non-defective product X1 cannot be correctly determined as a non-defective product by the determination of the non-defective product X1 by the RGB image (X1). That is, it can be considered that, for the determination of the non-defective product X1, the spectroscopic camera 7 is necessary because the RGB camera is not sufficient.

In other words, when it is not determined by the inspection based on the RGB image (X1) of the non-defective product X1 that the non-defective product X1 is a non-defective product and when it is determined by the inspection based on the spectrum image Ssam(X1), that is, the plural-wavelengths non-defective product image of the non-defective product X1 that the non-defective product X1 is a non-defective product, it can be determined that the RGB camera inspection using the RGB camera does not satisfy the predetermined criterion, that is, does not have reliability equal to or higher than the threshold and the spectroscopic camera inspection using the spectroscopic camera 7 satisfies the predetermined criterion, that is, has reliability equal to or higher than the threshold.

As explained above, the spectrum-information generating section 604 functions as a determining section that carries out the inspection of surface properties with the non-defective product X1 set as the object X and assuming use of the RGB camera to determine whether the inspection by the RGB camera is sufficient or the inspection by the spectroscopic camera 7 is necessary.

<13D> Subsequently, the spectrum-information generating section 604 carries out, based on the RGB image (X2) simulated for the defective product X2, an inspection of surface properties with the defective product X2 set as the object X and assuming use of the RGB camera (S14D; a determining step).

In other words, the spectrum-information generating section 604 acquires the RGB image (X2) obtained in the step <11D>. Thereafter, the spectrum-information generating section 604 carries out analysis processing using the RGB image (X2) as a feature value to carry out an inspection of surface properties with the defective product X2 set as the object X and assuming use of the RGB camera.

Specifically, first, the spectrum-information generating section 604 projects, as a feature value, the RGB image (X1) of the non-defective product X1 to the discrimination space suitable for discriminating surface properties of the non-defective product X1 used in the step <12D>. That is, the spectrum-information generating section 604 generates the projection function f(•) based on a specific discrimination criterion. Examples of the discrimination criterion include a Fischer discrimination criterion and a least squares criterion. The spectrum-information generating section 604 projects the RGB image (X1) of the non-defective product X1 to the discrimination space to set a position y(a').

$$y(a')=f(\text{RGB image}(X1))$$

Similarly, the spectrum-information generating section 604 projects the RGB image (X2) of the defective product X2 to the discrimination space and sets y(c').

$$y(c')=f(\text{RGB image}(X2))$$

The spectrum-information generating section 604 calculates a distance m2' between the position y(a') on the discrimination space of the non-defective product X1 and the position y(c') on the discrimination space of the defective product X2. The spectrum-information generating section 604 calculates the distance m2' for combinations of a plurality of non-defective products X1 and a plurality of defective products X2.

$$m2'=g(y(a'),y(c'))$$

In the above expression, g(a, b) is a function for calculating a distance between "a" and "b" in the discrimination space. As the distance, for example, a Mahalanobis distance or a Euclidean distance can be used.

When the distance m1<the distance m2' holds at a fixed probability or more (preferably, 100%), that is, a threshold or more for the distance m2' calculated for the combinations of the plurality of non-defective products X1 and the defective products X2, it is considered that the defective product X2 is correctly determined as a defective product by the determination of the defective product X2 by the RGB image (X2) as well. That is, it can be considered that, for the determination of the defective product X2, the spectroscopic camera 7 is unnecessary and the RGB camera is sufficient.

In other words, when it is determined by the inspection based on the RGB image (X2) of the defective product X2 that the defective product X2 is a defective product, it can be determined that the RGB camera inspection using the RGB camera satisfies a predetermined criterion, that is, has reliability equal to or higher than the threshold.

A region closer than the distance m1 can be considered a region indicating a non-defective product distribution obtained by the third inspection result. Therefore, a percentage of the defective product X2 being included in the region, that is, a percentage of the distance m1 the distance m2' holding is smaller than the set threshold, it can be determined that the predetermined criterion is satisfied.

To the contrary, when the distance m1 the distance m2' holds at the fixed probability or more (preferably, 100%), that is, the threshold or more for the distance m2' calculated for the plurality of defective products X2, it is considered that the defective product X2 cannot be correctly determined as a defective product by the determination of the defective product X2 by the RGB image (X2). That is, it can be considered that, for the determination of the defective product X2, the spectroscopic camera 7 is necessary because the RGB camera is not sufficient.

In other words, when it is not determined by the inspection based on the RGB image (X2) of the defective product X2 that the defective product X2 is a defective product and when it is determined by the inspection based on the spectrum image Ssam(X2), that is, the plural-wavelengths defective product image of the defective product X2 that the defective product X2 is determined as a defective product, it can be determined that the RGB camera inspection using the RGB camera does not satisfy the predetermined criterion, that is, does not have reliability equal to or higher than the threshold and the spectroscopic camera inspection using the spectroscopic camera 7 satisfies the predetermined criterion, that is, has reliability equal to or higher than the threshold.

A probability, that is, a threshold of determination for determining that the non-defective product X1 is a defective product in the step <12D> and a probability, that is, a threshold of determination for determining that the defective product X2 is a non-defective product in this step <13D> are considered to be errors allowed in the present disclosure. The magnitude of the errors allowed in the present disclosure, in other words, the predetermined criterion set in the present disclosure is set according to accuracy requested of the spectroscopic inspection method according to the present disclosure considering a second inspection result, which is a result of a predetermined inspection for the non-defective product X1 performed using the RGB image (X1) of the non-defective product X1 in the step <12D> and a first inspection result, which is a result of a predetermined inspection for the defective product X2 performed using the RGB image (X2) of the defective product X2 in this step <13D>.

<14D> Subsequently, the display control section creates, as a visualized image, an inspection result specified by the spectrum-information generating section 604 and thereafter causes the display device 61 to display the visualized image (S15D).

Examples of information displayed on the display device 61 as the visualized image include a result of determination about whether the RGB camera is sufficient or the spectroscopic camera 7 is necessary for the determination of the non-defective product X1 and a result of determination about whether the RGB camera is sufficient or the spectroscopic camera 7 is necessary for the determination of the defective product X2.

By carrying out the inspection processing including the step <1D> to the step <14D> using the robot system 100, it is possible to determine whether the RGB camera is sufficient or the spectroscopic camera 7 is necessary for the determining whether the object X is the non-defective product X1 or the defective product X2.

As explained above, with the spectroscopic inspection method using the robot system 100, it is possible to determine, without necessity of preparing the RGB camera in advance and without necessity of providing optical paths of two systems for switching the RGB camera and the spectroscopic camera 7, whether the RGB camera is sufficient or the spectroscopic camera 7 needs to be selected. Therefore, it is possible to surely prevent the configuration of the robot system 100 from being complicated.

In the above explanation in this embodiment, both of the simulation of the RGB image (X1) of the non-defective product X1 and the simulation of the RGB image (X2) of the defective product X2 are carried out and both of the inspection of surface properties based on the RGB image (X1) of the non-defective product X1 and the inspection of surface properties based on the RGB image (X2) of the defective product X2 are carried out. Although it is desirable from the viewpoint of improving accuracy of the inspection to carry out both of the simulations and both of the inspections, the simulation of the RGB image (X1) of the non-defective product X1 and the inspection of surface properties based on the RGB image (X1) can be omitted. That is, the simulation of the RGB image (X2) of the defective product X2 and the inspection of surface properties based on the RGB image (X2) may be independently carried out. Consequently, it is possible to surely prevent the defective product X2 from being mixed in articles determined as non-defective products.

The spectroscopic camera and the inspection system according to the present disclosure are explained based on the embodiment shown in the figures. However, the present disclosure is not limited to the spectroscopic camera and the inspection system.

For example, in the inspection system according to the present disclosure, the components can be replaced with any components that can exert the same functions or any components can be added.

In the inspection system according to the present disclosure, in the embodiment, the object set on the workbench and the spectroscopic camera are relatively moved in the optical axis direction of the spectroscopic camera to focus the spectroscopic camera on the object. However, a method of focusing the spectroscopic camera is not limited to this. It is also technically possible to focus the spectroscopic camera by changing a focal distance, which is a separation distance between the lens and the imaging element of the spectroscopic camera, that is, a focus in a state in which the robot arm is fixed.

What is claimed is:

1. A spectroscopic camera comprising:
 a spectroscopic section configured by a variable wavelength interference filter that selectively transmits light at a predetermined wavelength and changes the light to transmitted light;
 a receiving section configured to receive sensitivity information indicating a sensitivity curve in a wavelength region of a predetermined color imaged by an RGB camera;
 a processor including a spectrum-information generating section configured to generate, based on the sensitivity information, a wavelength table indicating a relation between the predetermined wavelength and a transmission time, which is a time for transmitting the transmitted light;
 an imaging section configured to acquire a spectral image formed by the transmitted light transmitted through the spectroscopic section; and
 a control section configured to control the spectroscopic section and the imaging section based on the wavelength table.

2. The spectroscopic camera according to claim 1, wherein the time for transmitting the transmitted light is set based on intensity indicating sensitivity to fixed optical energy, in wavelengths obtained by dividing the wavelength region of the predetermined color, included in the sensitivity information.

3. The spectroscopic camera according to claim 1, wherein the imaging section captures, for each the predetermined wavelength, spectral image based on the time for transmitting the transmitted light in the spectroscopic section.

4. The spectroscopic camera according to claim 1, further comprising:
 an RGB-image generating section configured to image a defective product using the spectroscopic camera to acquire a defective-product spectral image and generate a defective-product RGB image based on the defective product spectral image; and
 a determining section configured to, when a predetermined inspection for the defective product is performed using the defective-product RGB image and the defective product is determined as defective, determine that an RGB camera inspection using the RGB camera satisfies a predetermined criterion, and when the predetermined inspection for the defective product is performed using the defective-product RGB image and the defective product is not determined as defective and when the predetermined inspection for the defective product is performed using a plural-wavelengths defective product image obtained by imaging the defective product using the spectroscopic camera and the defective product is determined as defective, determine that the RGB camera inspection does not satisfy the predetermined criterion and a spectroscopic camera inspection using the spectroscopic camera satisfies the predetermined criterion.

5. The spectroscopic camera according to claim 4, wherein
- the RGB-image generating section images a non-defective product using the spectroscopic camera to acquire a non-defective-product spectral image and generates a non-defective-product RGB image based on the non-defective-product spectral image, and
- the determining section sets the predetermined criterion according to a first inspection result, which is a result of the predetermined inspection for a plurality of the defective products performed using the defective-product RGB image, and a second inspection result, which is a result of the predetermined inspection for a plurality of the non-defective products performed using the non-defective-product RGB image.

6. The spectroscopic camera according to claim 5, wherein the determining section images the plurality of non-defective products using the spectroscopic camera to acquire a plural-wavelengths non-defective product image, calculates a region indicating a distribution of a plurality of third inspection results, which are results of the predetermined inspection for the plurality of non-defective products performed using the plural-wavelengths non-defective product image, performs the predetermined inspection for the plurality of defective products using the defective-product RGB image, calculates a percentage of the first inspection result being included in the region when the plurality of defective products are determined as defective, and, if the percentage is smaller than a set threshold, determines that the predetermined criterion is satisfied.

7. An inspection system comprising the spectroscopic camera according to claim 1.

* * * * *